United States Patent [19]

Gilbert et al.

[11] Patent Number: 5,038,282

[45] Date of Patent: Aug. 6, 1991

[54] SYNCHRONOUS PROCESSOR WITH SIMULTANEOUS INSTRUCTION PROCESSING AND DATA TRANSFER

[75] Inventors: Ira H. Gilbert, Carlisle; Nicodemo A. Ciccia, North Reading, both of Mass.

[73] Assignee: Massachusetts Institute of Technology, Cambridge, Mass.

[21] Appl. No.: 193,247

[22] Filed: May 11, 1988

[51] Int. Cl.[5] .................. G06F 15/80; G06F 15/16; G06F 13/00

[52] U.S. Cl. .................. 364/200; 364/231.9; 364/238.4; 364/260

[58] Field of Search .................. 364/200, 900

[56] References Cited

U.S. PATENT DOCUMENTS

| | | | |
|---|---|---|---|
| 3,979,728 | 9/1976 | Reddaway | 340/172.5 |
| 4,101,960 | 7/1978 | Stokes et al. | 364/200 |
| 4,314,349 | 2/1982 | Batcher | 364/716 |
| 4,598,400 | 7/1986 | Hillis | 370/60 |
| 4,873,626 | 10/1989 | Gifford | 364/200 |
| 4,901,360 | 2/1990 | Shu et al. | 364/200 |
| 4,985,832 | 1/1991 | Grondalski | 364/200 |

OTHER PUBLICATIONS

*IEEE*, "Architecture of the MPP", by Kenneth E. Batcher, 1983, pp. 170-174.
*IEEE*, "The MPP in the Future", by Kenneth E. Batcher, 1987, pp. 60-62.
*NASA Form* 1626, "Array Unit", Oct. 1986, pp. i-xii and 293-297.
*The Massively Parallel Processor*, "Array Unit", by Kenneth E. Batcher, 1985, pp. vi-vii and 150-190.
*IEEE*, "The Architecture of the Massively Parallel Processor", by Douglas R. Smith, 1987, pp. 56-59.
"The Massively Parallel Processor (MPP) Innovation in High Speed Processors", by John Tsoras, 1981, pp. 196-201.
*Elliptic Problem Solvers*, "Application of a Parallel Processor to the Solution of Finite Difference Problems", by Hunt et al., pp. 339-344.
*Computer Phys. Comm.* 28, "The Distributed Array Processor (DAP)", by D. Parkinson, 1983, pp. 325-336.
*Proceedings of the IEEE*, vol. 60, No. 4, "The Illiac IV System", by Bouknight et al., Apr. 1972, pp. 369-388.
*NASA CR*-2159, "Illiac IV Systems Characteristics and Programming Manual", Feb. 1973, pp. 1-31.
*Computer Design*, "Parallel-Processing Concepts Finally Come Together in Real Systems", Bond, Jun. 1, 1987, pp. 51-74.
*Scientific American*, "The Connection Machine", by W. Daniel Hillis, Jun. 1987, pp. 108-115.
*Computer Design*, "Parallelism Breeds a New Class of Supercomputers", Mokhoff, Mar. 15, 1987, pp. 53-64.
*IEEE*, "Supercomputers for Superproblems: An Architectural Introduction", by Chris Norrie, 1984, pp. 62-74.
"The Aspro Parallel Inference Engine (A Real-Time Expert System)", by Reed et al., pp. 248-259.

*Primary Examiner*—Eddie P. Chan
*Attorney, Agent, or Firm*—Hamilton, Brook, Smith & Reynolds

[57] ABSTRACT

In a single instruction multiple data synchronous processor, each slave processor of an array includes a computational element and an isolated slave memory. Instructions broadcast to the slave processors may be processed simultaneously with data transfers between slave memories through communications registers and between the slave memories and an I/O processor through I/O registers. A multiplexer in each slave processor selects as an input to the communications register a signal from an adjacent slave or a nonadjacent slave to bypass a column in the array. Broadcast instructions may be overridden by individual slave processors by conditional instructions which set the otherwise unused program counter of the computational element. An array master, communication master and input/out processor may process respective sets of instructions in parallel, each addressing slave memories through a common memory controller. Code handled by the array master may be separated into control code processed by the array master and computation code broadcast to the slave processors by a translator. An incremental addressing scheme is provided. The translator may unroll one type of loop instruction to provide straight-line code processed by the slave processors or may retain loop instructions for processing as control code in the array master.

7 Claims, 17 Drawing Sheets

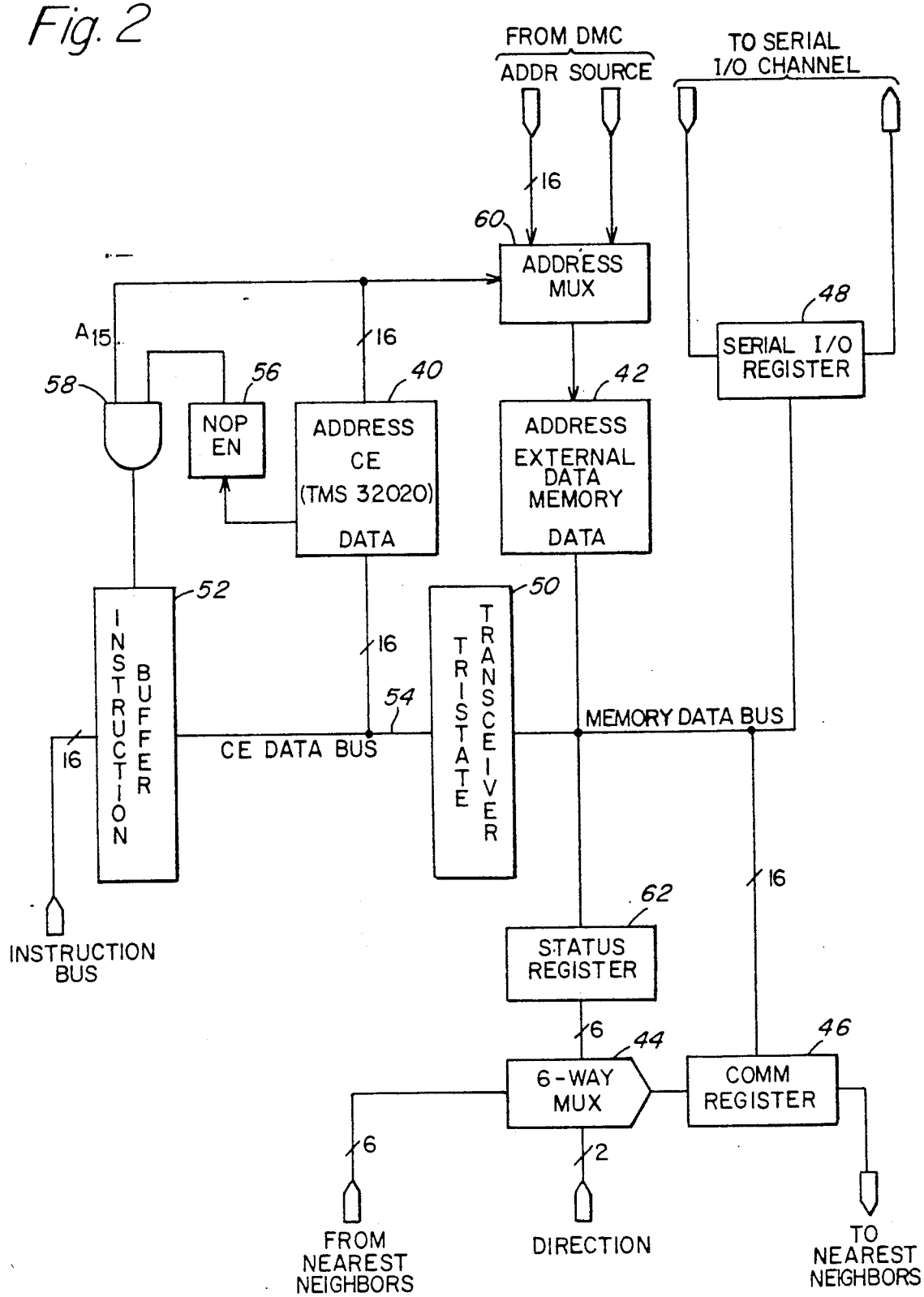

Fig. 3

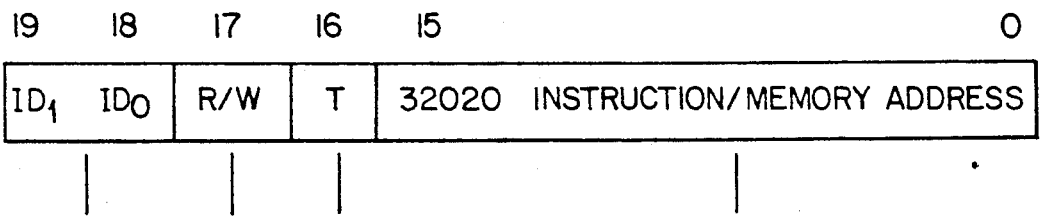

Fig. 4

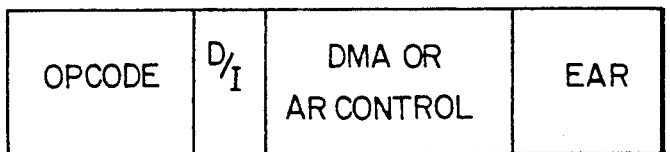

EAR SELECT FIELD: DETERMINES EAR USED WITH DIRECT AND INCREMENTAL ADDRESSING MODES. ALSO PART OF DMA IN TI DIRECT ADDRESSING MODE.

DMA/AR CONTROL: BITS 6-0 FORM THE DATA MEMORY ADDRESS FOR TI DIRECT ADDRESSING MODE (D/I=0). BITS 6-3 CONTROL THE AUX. REGISTERS FOR INDIRECT ADDRESSING MODE (D/I=1.)

DIRECT/INDIRECT SELECT BIT: SELECTS TI DIRECT ADDRESSING IF=0, INDIRECT IF=1.

32020 INSTRUCTION OPCODE

SYNCHRONOUS PROCESSOR WITH SIMULTANEOUS INSTRUCTION PROCESSING AND DATA TRANSFER

The U.S. Government has rights to this invention under contract number F19628-85-C-0002 with the Department of the Air Force.

CROSS-REFERENCE TO RELATED APPLICATION

A related application Ser. No. 07/193,248, "Synchronous Processor Translator", is being filed on even date herewith by the inventors of this application and is incorporated herein by reference. That application includes a microfiche appendix with software.

BACKGROUND OF THE INVENTION

Conventional computer systems utilize a von Neumann organization in which a single instruction stream is applied to a single processor to operate on a single data stream. In such systems, the performance is closely coupled to the performance of the single processor. In parallel systems, on the other hand, an array of processors operate in parallel on multiple data streams. Performance of the system can be increased as a function of the number of processors in the array as well as the performance of individual processors.

Parallel architectures generally fall into two categories: single instruction, multiple data (SIMD) and multiple instruction, multiple data (MIMD). In SIMD systems, a single instruction stream is broadcast to all processors of the array, and all processors simultaneously perform the same operations but on different sets of data. In MIMD systems, each processor is provided with its own instruction set so that different instructions can be applied to different sets of data in parallel. Although MIMD systems are more flexible in their applications, they can be more difficult to program and present the difficulty of transferring a large number of instruction sets to the many processors. SIMD systems, on the other hand, may be best suited to particular applications such as image processing, multidimensional signal processing, hydrodynamic simulation, seismic processing and neural network simulation.

DISCLOSURE OF THE INVENTION

The present invention has particular application to SIMD systems, but certain features can be extended to other parallel processors and even to single processor systems.

In a parallel data processing system, an array of slave processors simultaneously processes multiple streams of data. Each slave processor comprises a computational element (CE) having local memory and a slave memory which stores data to be transferred to and processed by the computational element. The CE and slave memory are buffered to allow simultaneous transfer of instructions to the CE for processing and the transfer of data to and from the slave memory. Preferably, the slave processor includes an input/output register for data being transferred between the slave memory and a system memory and a communications register for data being transferred between the slave memory and another processor of the array.

To allow bypass of adjacent slave processors in data transfers within the array, a multiplexer may be coupled to recieve data from an adjacent slave processor and to receive data from a nonadjacent processor. By selecting, as in input to the processor, the signal from the nonadjacent processor, the adjacent processor may be bypassed. This feature may be used to bypass a vertical or horizontal column of slaves in the array. A status register may be provided to select a predetermined input through the multiplexer. For example, a slave processor may receive all zeros as an input from one or more directions.

Each CE receives instructions which are broadcast to the array. An instruction override may be provided in each slave processor to provide a "no operation" instruction to the CE regardless of the broadcast instruction. To that end, the program counter which is available in a conventional microprocessor serving as the CE, yet which is not required in normal operation of the microprocessor in the parallel system, may be utilized to enable the instruction override. The CE is able to process a conditional instruction which sets the program counter. The instruction override is then responsive to a predetermined count of the program counter to provide the "no operation." In this way, a common conditional branch instruction can be applied to all processors of the array and the branch, and thus the alternative "no operation" sequence, is dependent on the data within the individual CE. The instruction override may be disabled to prevent inadvertent activation of the "no operation" as the program counter happens on the predetermined count.

Preferably, data processing and transfers within the array are controlled by an array master processor and a communication master processor. The array master processor processes an operational set of instructions and forwards computational instructions to the computational elements of the array for parallel processing of data. The communication master processor processes a communication set of instructions to control transfers of data between slave processors of the array. The array master processor and communication master processor process the operational and communications sets of instructions in parallel. Also, because of the buffer between the slave memory and CE, the instructions and the data can be fed to the slaves in parallel.

The system may further comprise an input/output processor, which may be a host processor, to process an input/output (I/O) set of instructions to control transfer of data between processors of the array and the system memory. The I/O processor processes the I/O set of instructions in parallel with processing of the operational and communications sets of instructions by the array master processor and the communication master processor. All addressing of the slave memories by the array master processor, the communication master processor and the I/O processor may be through a common data memory controller.

The operational set of instructions processed by the array master processor may include control code and computational code derived from a single instruction set by a translator. The computational code is broadcast to the computational elements of the array for parallel processing of data. The control code is processed by the array master processor. Blocks of control code and blocks of computational code may be processed simultaneously by the array master processor and the computational elements. The array master stores the control code and computational code separately. In response to an instruction in the control code, the array master transfers a block of computational code to the computational elements. The array master processor then continues processing of control code during transfer of the computational code.

The system may include an address indexing circuit which responds to novel incremental addressing instructions. An index register stores an address to be applied to memory. An adder receives an increment value from an instruction and adds the increment value to the address stored in the index register. The adder output is coupled to the index register input to store the new incremental address.

Preferably, a translator preprocesses instructions to the data processing system to allow for alternative approaches to handling loop instructions. The translator responds to a first loop instruction to unroll the loop into a set of straight-line instructions and retains a second-type loop instruction as a loop instruction. Those which are retained as loop instructions are thereafter processed as control code in the array master. However, the straight-line instructions, having been preprocessed by the translator, can be processed by the computational elements as a large block of straight-line computational code.

BRIEF DESCRIPTION OF THE DRAWINGS

FIG. 2 is a block diagram of a single slave processor of the system of FIG. 1.

FIG. 3 is an illustration of a machine code word applied to the slave processor of FIG. 2.

FIG. 4 is an illustration of the instruction field format of the code word of FIG. 3.

PREFERRED EMBODIMENT OF THE INVENTION

Figure 1:
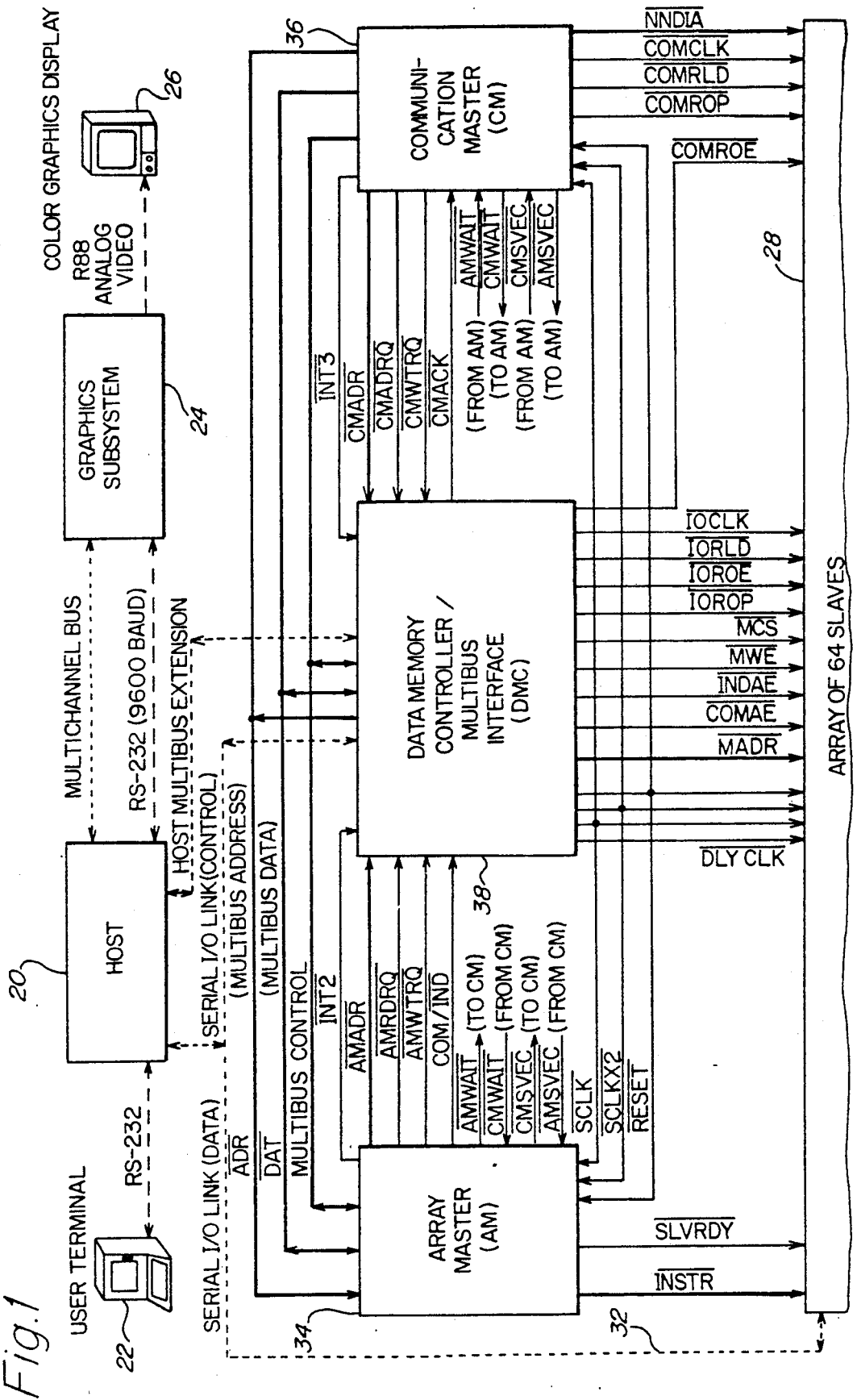
FIG. 1 is a system block diagram of the system embodying the present invention.

As illustrated in FIG. 1 and discussed in greater detail below, the system comprises a set of hierarchically arranged elements. At the apex is the host computer 20 which exercises overall control and which communicates with the external world via standard computer peripherals including terminal 22, and through graphics subsystem 24, display 26. Data are sent between the host and an array 28 of slave processors via eight serial input/output channels 32.

The next level of the hierarchy includes an array master 34 (AM), a communication master 36 (CM) and a data memory controller 38 (DMC). The AM functions primarily as an instruction source for the array. The CM manages a nearest neighbor communication network between the computational elements. The DMC generates slave data memory addresses required by the host-AM-CM/slave interaction.

The level of the hierarchy where processing actually takes place is in this embodiment the array 28 of 64 slave processors, each with its own memory, arranged in a grid of eight rows by eight columns with toroidal edge connection. Each slave communicates with its four nearest neighbors. A degree of fault tolerance is provided by allowing isolated failed columns to be deleted.

As illustrated in FIG. 2, each slave contains a computational element 40 (CE) which is a Texas Instruments TMS 32020 digital signal processor microcomputer chip. These commercial components are used unconventionally. They access no program memory and the addresses provided by their program counters are usually ignored. Instead of each slave fetching its own instructions, a common instruction stream is broadcast by the single AM.

Data memory is distributed evenly among the slaves. Each CE may access 64K 16-bit words, of which 544 words are internal (on-chip) and the rest external (off-chip). Usually the external slave memory 42 is addressed by the single DMC rather than by the individual CEs themselves. This permits use of slower memory devices without necessitating the use of wait states and also facilitates direct addressing of the full 65K data address space.

Each slave communicates with its four nearest neighbors via a network which includes a multiplexer 44 and a serial/parallel shift register 46 (communication register) at each slave. This network is under the control of the CM. The CM operates independently of the CEs, in much the same way as a conventional DMA controller. Each word to be transferred is moved from the external data memory of one slave, through the network, to the external data memory of another slave. The transfers occur in lock step. The source and destination addresses and the direction of transfer must be identical for all slaves. Since the CEs do not participate in this communication, they are free to concurrently perform arithmetic operations on the data within their internal memories.

Similarly, the host 20 can exchange data with the slaves' external memories 42 via eight serial I/O loops, each comprising a serial/parallel register 48 (SIO register) in each slave, and a similar register in the host. Each column of the array is served by a separate loop. In this respect, the host 20 serves as an input/output processor.

Since the AM 34, the CM 36 and the host 20 may independently request access to the data memory, these requests must be arbitrated. This is done by the DMC 38 on a strictly prioritized basis. The system is designed so that the expensive CEs are maximally utilized. Thus, the AM is assigned highest priority for data access, next priority is assigned the CM, and lowest priority is assigned the host.

To the programmer, the system looks like three processors—the host, the AM/computational array combination and the communication network. By the very nature of SIMD processing, only a single slave need be considered, the rest will follow in lock step. It is, however, necessary to coordinate the transfer of data by the CM and the host with the computation being controlled by the AM.

The host is a conventional minicomputer based on the INTEL 80286 microprocessor. Its code is conventional and may be written in Fortran C or PL/M. The communication code, executed by the CM, is also conventional. The CM instruction set provides simple control operations such as calls and jumps as well as the necessary operations to select the source and destination addresses and the direction of data transfer. The control of the computational elements is somewhat less conventional.

To the application programmer, the operational code consists of the usual mixture of control and arithmetic operations to be executed sequentially. However, to maximize the throughput of the system without resorting to extremely fast components, the hardware actually executes control and arithmetic concurrently. Control instructions are executed by the sequencer which is part of the AM 34, while arithmetic is done by the 64 CEs. This is accomplished by preprocessing the unified code in a translator prior to run time and splitting it into its control and arithmetic components. These separate components are then downloaded into separate program memories which can be independently accessed. In this way, the CEs can be kept constantly busy doing arithmetic without unnecessary overhead for control. In addition, since the separation of code is done prior to run time, the AM controller need not run expecially fast and may be constructed of standard components.

To understand the system in greater detail it is best to start from the bottom, the slaves, and work up to the host.

THE SLAVES

The organization of a single slave is shown in FIG. 2. Primarily, data and address paths are presented, with most control paths omitted for clarity.

The principal components of the slave are the CE 40 (TMS 32020 digital signal processor chip) and the 64K word external slave data memory 42. Each of these is provided its own data bus. These busses may be isolated by a tristate transceiver 50 to allow concurrent and independent operation of the CE and data memory, or else they may be connected by the tristate transceiver to allow the CE to communicate with the memory.

On each instruction cycle, an instruction is broadcast by the AM to the array. Although the CEs generate program addresses in an attempt to fetch the next instruction, these addresses are generally ignored. Each slave simply receives the common broadcast instruction through a buffer 52 and the CE data bus 54. Occasionally, however, it may be necessary to depart from strict lockstep processing and allow individual slaves to simply mark time while others continue to compute. This is accomplished by allowing the instruction buffer 52 either to transmit the broadcast instruction or else to emit the NOP (no operation) instruction, depending on the state of a specific control signal. This input is active when the CE causes the most significant bit of its program address ($A_{15}$) to be high, and when a NOP enable register 56 has been previously set as determined by AND gate 58. This is the only use made of the CE's program counter. The count of the program counter is itself set by any one of the conditional branches available in the instruction set of the CE.

Suppose, for example, that one wishes to execute either a string of N instructions or N NOPs, depending on whether the CE accumulator zero flag is set. One merely programs a BZ (branch on zero) instruction to an address which is N less than $2**16=64K$. If the branch occurs, NOPs will continue to be executed until the program counter rolls over from FFFF to 0000. If desired, one may synchronize all program counters by following the last of the string of N instructions by a B (unconditional branch) instruction to location 0000 (or any other address below 7FFFF). The entire process is illustrated in Table 1. Note that both conditional and unconditional branching instructions require two cycles and two program memory words. Essentially every conditional branch instruction native to the TMS32020 may be used in this fashion. Very little additional hardware is required since use is made of the program counter and instructions which are available on the TMS32020 for conventional applications but which are not otherwise used in this SIMD application.

The use of conditional NOPs implies certain overhead in that the program counter must be periodically reset before inadvertently incrementing beyond 7FFF and so shutting off the instruction stream. Although this is not a substantial burden, it may be avoided altogether when conditional NOPs are not needed by resetting the NOP enable register 56. This register is set by outputting any value to CE output port 3 and reset by outputting any value to port 2.

TABLE 1

Conditional NOPs

| Instruction Cycle | Accumulator < > 0 | | Accumulator = 0 | |
|---|---|---|---|---|
| | Program Counter | Instruction | Program Counter | Instruction |
| 1 | 0032 | BZ | 0032 | BZ |
| 2 | 0033 | FFFC | 0033 | FFFC |
| 3 | 0034 | INST 1 | FFFC | NOP |
| 4 | 0035 | INST 2 | FFFD | NOP |
| 5 | 0036 | INST 3 | FFFE | NOP |
| 6 | 0037 | INST 4 | FFFF | NOP |
| 7 | 0038 | B | 0000 | B |
| 8 | 0039 | 0000 | 0001 | 0000 |
| 9 | 0000 | INST 5 | 0000 | INST 5 |

The TMS32020 is a complete microcomputer, and its role as a simple slave arithmetic and logical unit may appear to waste much of its capabilities. In actuality, those features which make the greatest demand on the chip's resources (parallel multiplier, on-chip memory, etc.) are fully utilized. The CEs may make use of all arithmetic, logical, and data transfer instructions. Most branching instructions are available to support the conditional NOPs. No use is made of the subroutine CALL and RET instructions, nor of the hardware and software interrupts, on-chip program memory configuration, and I/O ports (except for control purposes such as NOP enable).

The TMS32020 is very fast. Most instructions take a single 170 ns cycle. The instruction set is optimized for common signal processing operations, especially convolution. Not only can this device multiply two 16-bit quantities to a 32-bit product in a single cycle, it can even perform a multiplication, accumulation, and data shift (the basic steps of convolution) in a single cycle if the data are appropriately located in internal memory. Although no divide instruction is provided, a conditional subtract instruction allows reasonably efficient division by software. One 16-bit number may be divided by another in 32 cycles, or 5.44 microseconds; much slower than multiplication but acceptable for applications where division is infrequent.

The TMS32020 is basically a 16-bit, fixed-point CPU. Although multiple precision and floating-point arithmetic can be programmed, they substantially degrade throughput. However, in light of some important hardware features, the basic word size appears adequate for many important signal processing applications. First of all, although data are stored as 16-bit quantities, sums and products are computed to 32-bit precision. This limits the accumulation of intermediate errors. Secondly, provision is made to rescale the arguments and results of various operations as part of these operations rather than by requiring additional shifts which would degrade throughput. Finally, the accumulator may be set to saturate at its greatest positive and negative values rather than overflowing or underflowing. This is especially useful for noiselike data for which extreme values are infrequent but not impossible. As provided in hardware this saturation mode allows accumulation at full speed, something not possible if each summation had to be sequentially tested and possibly corrected.

A basic operating principle is that the Array Master (AM) generates an instruction "stream" that looks like program memory to the CEs (TMS32020s). In order for the AM to successfully execute this task, the assembly language instructions presented in The TMS32020 User's Guide must be augmented and/or modified. It is the responsibility of the SP translator to transform TMS32020 assembly language instructions into CE object code that the AM understands.

The CEs can address 64K words of data memory. Of these, 544 words are internal to the TMS32020 and the rest external. Four different address modes are provided. Paged addressing is native to the TMS32020 instruction set and is restricted to internal memory access only. Indirect addressing is also native to the TMS32020 instruction set and is applicable to the entire address space. Direct and incremental addressing are modes that have been added and are applicable only to external data memory 42.

Although the TMS32020 may address 64K words of data memory, an address field of only 7 bits is available in its instructions. This field defines an entry into a 128-word page. In page addressing, the full 16-bit address is formed by combining the 7-bit field with the contents of a 9-bit page pointer. Although this mode could be used to access the full 64K word data memory, this system uses it only to access internal memory. Thus, only the first five pages are used.

In the indirect addressing mode, the address field of the TMS32020 instruction refers to one of five 16-bit auxiliary registers. The contents of that register form the full data memory address. This address may refer to internal or external space. Indirect addressing is used to allow different slaves to access different data locations, a modest but very useful departure from pure lockstep processing. This is the only mode in which external data memory addresses are determined by the CE.

The direct addressing mode is not part of the TMS32020 instruction set but is an addition of the present system. It exploits the fact that external data memory accesses require at least two cycles, one to fetch the instruction, another to transfer the data. All instructions referring to data memory consist of a single word. For external data references, therefore, a second word may be inserted in the instruction stream, not to be interpreted by the CE, but by special hardware in the AM. In this way a supplementary 16-bit address field has been provided to directly address the full external data space. Since the address is not generated by the CE but by the AM and DMC from the instruction stream, it is possible to look upstream and anticipate its value. In this way slower memory can be used without requiring wait states. The indirect addressing mode, which makes use of CE-generated external addresses, would involve the need for wait states.

The incremental addressing mode is not native to the 32020 instruction set but is provided for greater convenience in accessing arrays stored in external memory. As discussed below, it is implemented by means of eight EARs (external auxiliary registers). Each EAR may be initialized by referring to it in an instruction in the direct addressing mode. Subsequent reference to that EAR, in an instruction in the incremental mode, will add to the contents of the EAR the 2's-complement value specified in the supplementary 16-bit address field. Repeating such an instruction causes the address to be incremented or decremented by constant steps. Transfers via indirect addressing do not affect the EARs.

As shown in FIG. 2, the external data memory address is selected by a 16-bit two-way multiplexer 60 which is controlled by a source signal from the DMC. The address supplied by the CE is used when addressing is indirect, while the address supplied by the DMC is selected when addressing is direct or incremental.

TM32020s have access to an internal (on-chip) data space and an external (off-chip) data space. By definition, any CE instruction using paged or indirect on-chip addressing mode accesses internal memory; any instruction using direct, incremental or indirect off-chip mode accesses external memory. Immediate addressing mode instructions do not access memory. The TMS32020 User's Guide divides the 32020 instruction set into 13 classes based on the number of processor cycles required for execution. Classes VII, IX, XI and XIII, as well as CALL, LDP AND RPT, are not used. Classes III, IV and VI do not access data memory. Class V instructions only access internal RAM. This leaves classes I, II, VIII, X and XII as the assembly language instructions that are capable of accessing internal or external data memory. Class I, OUT and PSHD instructions can only read memory. Class II, IN and POPD only write.

Table D-2 in The TM32020 User's Guide provides instruction cycle timing information. All timings are for TMS32020s operating in non-repeat mode, using external program memory (PE/DI or PE/DE). To calculate timings for TMS32020 instructions, use the following values:

p=0
i=0
d=0 (direct or incremental addressing modes)
or
d=1 (indirect off-chip addressing mode)

Table 2 reflects the above values. Note that on-chip in Table 2 refers to either paged or indirect on-chip mode.

TABLE 2

Cycle Timings
32020 Instructions (non-repeat mode)

| INSTRUCTION CLASS | DATA ADDRESSING MODE SOURCE | DATA ADDRESSING MODE DESTINATION | # PROCESSOR CYCLES |
|---|---|---|---|
| I | on-chip | — | 1 |
|  | Direct/Incremental | — | 2 |
|  | Indirect off-chip | — | 3 |
| II | — | on-chip | 1 |
|  | — | Direct/Incremental | 3 |
|  | — | Indirect off-chip | 4 |
| III | — | — | 1 |
| IV | — | — | 2 |
| V | on-chip | on-chip | 3 |
| VI | — | — | 2 |
| VIII(IN) | — | on-chip | 2 |
|  | — | Direct/Incremental | 3 |
|  | — | Indirect | 4 |
| (OUT) | on-chip | — | 2 |
|  | Direct/Incremental | — | 3 |
|  | Indirect off-chip | — | 4 |
| X | on-chip | Direct/Incremental | 3 |
|  | on-chip | Indirect off-chip | 4 |
|  | Direct/Incremental | on-chip | 3 |
|  | on-chip | on-chip | 3 |
| XII(POPD) | — | on-chip | 2 |
|  | — | Direct/Incremental | 2 |
|  | — | Indirect off-chip | 3 |
| (PSHD) | on-chip | — | 2 |
|  | Direct/Incremental | — | 2 |
|  | Indirect off-chip | — | 3 |

As can be seen from Table 2, one CE assembly language statement can take as many as four processor cycles to execute. Since every processor cycle must be represented by a machine code word (MCW) in the CE instruction stream, one CE assembly language statement must translate into as many as four CE MCWs.

A CE MCW (20 bits wide) consists of a 16-bit instruction/address field and a 4-bit control field (see FIG. 3). The 4-bit control field determines the actions taken by the AM in controlling the CE instruction stream and accessing external CE data memory. Identifier bits $ID_1$ and $ID_0$ categorize each MCW into one of four classes. An actual TMS32020 instruction is tagged with ID=00. The 16-bit machine instruction is contained in the instruction/address field. An ID of 01 signifies an indirect off-chip access request, and the instruction/address value is irrelevant. An ID of 10 signifies that a direct addressing mode absolute address is contained in the instruction/address field. An ID of 11 signifies that an incremental addressing mode increment is contained in the instruction/address field. A request for memory access is issued by the AM for IDs 10, 10 and 11. The R/W bit indicates memory read or write, and the T bit is a terminate bit set to 1 only in the next to last word of a given XEQ code segment.

The EARs of the AM provide the analog of the TMS32020's auxiliary registers (ARs) for direct and incremental accesses of external memory A particular EAR is initialized (loaded with an absolute value) by a directly addressed instruction. Relative locations from that point can then be specified with incremental mode addressing. An EAR can be incremented ordecremented by any value within the range of +32,767 to −32,768. This value is specified by a 16-bit 2's -complement number placed in the instruction/address field. The sum of the inc/dec value and present EAR contents form the new EAR value. Summing is performed prior to memory access; thus, the incremented/decremented EAR value is used as the memory address. Note that this differs (see The TMS32020 User's Guide) from the TMS32020's ARs, in which incrementing/decrementing is accomplished after memory access.

Software must select which EAR will be used every time direct or incremental addressing is used; there is no external equivalent of the ARP for the EARs. The 3-bit EAR select field is located in the three least significant bits of the TMS32020 instruction (FIG. 4). Since these same 3 bits are loaded into the ARP when the TI indirect addressing mode "next ARP" option is used, caution must be exercised when using this option: it should not be used with direct or incremental addressing modes.

As stated previously, the number of MCWs produced by a given CE assembly language statement must equal the number of processor cycles required by the TMS32020 to execute the instruction. The first MCW (and also the second for two-word TMS32020 instructions) must be the TMS32020 instruction with an ID of 00. The remaining MCW(s) depend on the instruction class and addressing mode. The rule of thumb is that memory addresses and/or indirect off-chip access requests must be placed in the cycle(s) in which the TMS32020 would access memory. For example, a four-cycle instruction that indirectly accesses off-chip memory in cycles 3 and 4 (remember that all indirect off-chip accesses take two cycles to complete) must place requests for indirect access in MCWs 3 and 4 of the translated assembly language statement.

Note that for any CE instruction that accesses external memory, even though the actual memory addresses are contained in later MCWs, the TMS32020 instruction MCW (first MCW) must reference any address $\geq 1024$. This forces the TMS32020 to access off-chip memory, rather than its own internal RAM. This may be done by using paged addressing (MCW bit 7=0) with DP=8 or greater, or using a register whose contents are $\geq 1024$. If this is not done, regardless of what the other MCWs are, the TMS32020 will use on-chip memory, thereby causing unpredictable results.

EXAMPLES

This section presents a number of examples illustrating how various TMS32020 assembly language instructions are coded in the format required. Actual binary values for the ID and R/W bits are shown. Terminate bits are not shown since all TERM bits within an XEQ segment must be zero except for the TERM in the next to last MCW, which must be set to one. Actual TMS32020 statements are denoted with the syntax used in The TM32020 User's Guide except when an EAR must be selected. EAR selection is denoted by "EAR=X" with X being number from 0 to 3.

EXAMPLE 1

Class I and XII instructions require two MCWs for direct or incremental addressing and three for indirect off-chip addressing. The coding is straightforward. Example code for adding the contents of external data memory location 1000H to the accumulator (ADD, class I) is as follows:

| ID | R/W | INSTR/ADDR | |
|----|-----|------------|---|
| | | Direct Addressing, Using EAR #0 | |
| 00 | X | ADD *,EAR = 0 | AR used must contain |
| 10 | 1 | 1000H | a value ≧ 1024 |
| | | Indirect Off-Chip Addressing | |
| 00 | X | ADD * | AR used must contain |
| 01 | 1 | X | 1000H |
| 01 | 1 | X | |

X = don't care

EXAMPLE 2

Class II instructions require three MCWs for direct or incremental and four for indirect off-chip. Note that, unlike class I instructions that read memory, class II instructions write to memory; the TMS 32020 requires an additional cycle to accomplish an external memory write for class II. Neither instruction fetching nor external memory activity occurs during this cycle, but the instruction stream must still be "padded" with a dummy instruction of some sort to keep it in sync with the TMS32020. A NOP should be used. Example code for storing the lower half of the accumulator (SACL) to external location 1000H is as follows.

| ID | R/W | INST/ADDR | |
|----|-----|-----------|---|
| | | Direct Addressing, Using EAR #1 | |
| 00 | X | SACL 0 (DP = 32) | DP=32 w offset=0 |
| 00 | X | NOP | |
| 01 | 0 | X | points to address |
| 01 | 0 | X | 1000H |
| | | Indirect Off-Chip Addressing | |
| 00 | X | SACL X, D/I=0, EAR=1 | DP must be ≧8 for TI |
| 00 | X | NOP "dummy" Instruction | direct addressing, DMA |
| 10 | 0 | 1000H | value does not matter |

X = don't care

EXAMPLE 3

The class VIII instructions, IN and OUT, also require three cycles for direct or incremental mode and four for independent, but differ in either function or form from class II. IN is coded exactly as a class II, including a dummy instruction as the second MCW. The second cycle is not externally inactive as is the case for class II; data acquisition from the selected port occurs at this time. Note that data flows IN from the port to a memory location (memory write). OUT also uses a dummy instruction; however, it is the final cycle—when data is sent OUT to the port. An example of an OUT instruction using external memory location 1000H and port 5 is shown below.

| ID | R/W | INSTR/ADDR | |
|----|-----|------------|---|
| | | Incremental Addressing, Using EAR #2 | |
| 00 | X | OUT X, 5 (DP=8), EAR=2 | |
| 11 | 1 | FFF6 H (EAR #2 contains 100AH) | |
| 00 | X | NOP ("dummy" instruction) | |
| | | Indirect Off-Chip Addressing | |
| 00 | X | OUT *,5 | AR used must contain |
| 01 | 1 | X | 1000H |
| 01 | 1 | X | |
| 00 | X | "Dummy" instruction | |

X = don't care

Figure 5:
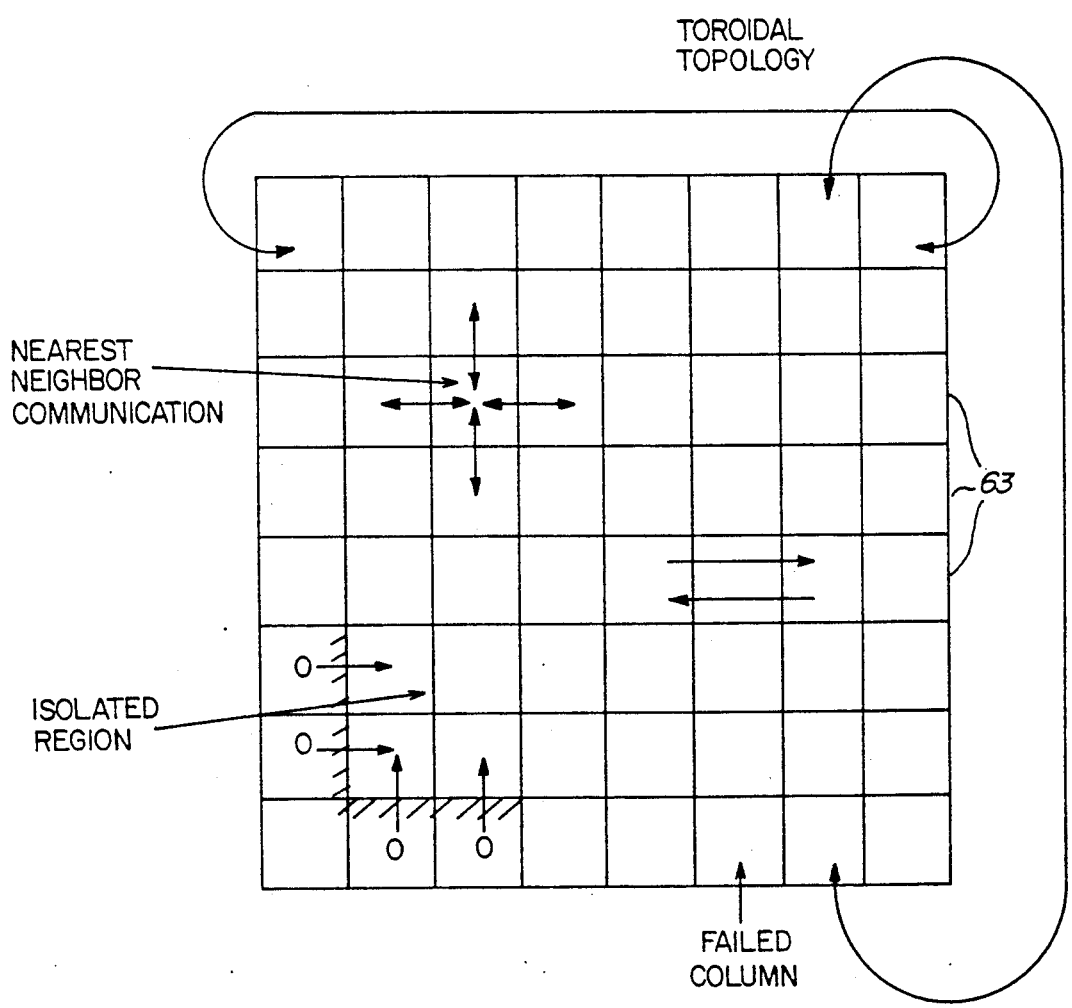
FIG. 5 illustrates several forms of inter-slave communication in the system of FIG. 1.

As shown in FIG. 5, the array is organized as an 8×8 matrix of slaves 63 having toroidal topology. That is, the right and left edges are joined as are the top and bottom of the array. As discussed shortly, this topology may be modified under program control. In general, each slave communicates with its four principal nearest neighbors. However, fault tolerance is provided by allowing entire failed columns to be skipped over. This is accomplished by connecting each slave to six others, to include its four principal nearest neighbors to its left and right.

Inter-slave communication is strictly lockstep and under the control of the CM. The communication cycle begins when the CM requests access to some word in external data memory. If the AM is not simultaneously requesting access, the CM request is granted. In this case, the tristate transceiver 50 of FIG. 2 is disabled, isolating the CE and memory data buses. The data memory address generated by the CM 36 is sent via the DMC 38 to the external data memory 42. The addressed word is then read from this memory and loaded into the 16-bit communication register 46.

Next, the 6-way multiplexer 44 is set to select the communication register output from one of the six neighboring slaves. If the required data transfer is, for example, from left to right, the multiplexer selects the nearest neighbor on the left if the leftward column is intact, or the next nearest neighbor on the left if the leftward column has failed. The CM is oblivious to the presence of failed columns. It merely commands the direction left to right. The failure of a column is detected by the host during the execution of various diagnostic programs. This information is then transmitted to slave memories of neighboring columns via the serial I/O links and stored, under control of the CE ports 1, as 2 bits within the 6-bit status registers 62 of the affected slaves. In this way, selection is made by active slaves, and there is no danger that a failed slave will affect its bypass.

The next step in inter-slave communication is to shift the 16-bit contents of the communication registers 46 serially over the interconnection network, through the multiplexer which has selected it, and on to the communication register 46 of the neighboring slave. The process of selecting the multiplexer direction, and serially shifting the data is repeated until the word reaches the nearest-neighbor register at its final destination. Then, provided that the AM is not accessing external data memory, the word is unloaded from the register 46 and written into the appropriate memory location. The source address, the shift direction, and the destination address are identical for all slaves.

The bit serial shift rate is twice the CE clock frequency, i.e., 12 Mhz, while a single CE cycle is required for the CM to read or write the data memory. Thus, to move a 16-bit word a distance of N slaves takes 2+8*N 170 ns cycles.

Four of the six bits of the status register 62 serve another function. It is convenient at times not to treat the array as a torus, but to allow all or part of it to be open and isolated. The four remaining status bits are used to instruct the multiplexer either to accept data as previously described or else to produce Os when data is to be received from specified directions. This choice specified by the contents of the individual slave status registers 62, is specific to each slave. For example, the slave near the lower left corner of FIG. 5 has been instructed to receive Os from beneath and from the left. It therefore forms a lower left corner of an isolated region. The 6-bit status register is accessed by the CE via I/O port 1.

The host computer communicates to the array via eight serial I/O (SIO) loops, one per column. The SIO subsystem is described below. Each loop consists of nine serial/parallel shift registers, similar to those used for inter-slave communication. One register per loop is located in the host, and one register 48 in each slave in the column. To input data to the array, the host loads its eight registers and then causes a series of 16-bit serial shifts at a 6 Mhz rate. This process is repeated until all 8 SIO registers in each column are filled. Then, when neither the AM nor the CM requires access to the data memory, the host, via the DMC, causes all 64 registers to be unloaded and written in corresponding locations in the 64 external data memories. Output from the array to the host is precisely the reverse process.

THE ARRAY MASTER

The array master (AM) serves three principal functions. First of all, it accesses the CE code space to broadcast arithmetic instructions to the slaves. Secondly, it passes external data memory addresses to the DMC for common access by all slaves. Finally, it executes the control instructions which were originally combined with arithmetic instructions but later separated by the translator.

Figure 6:
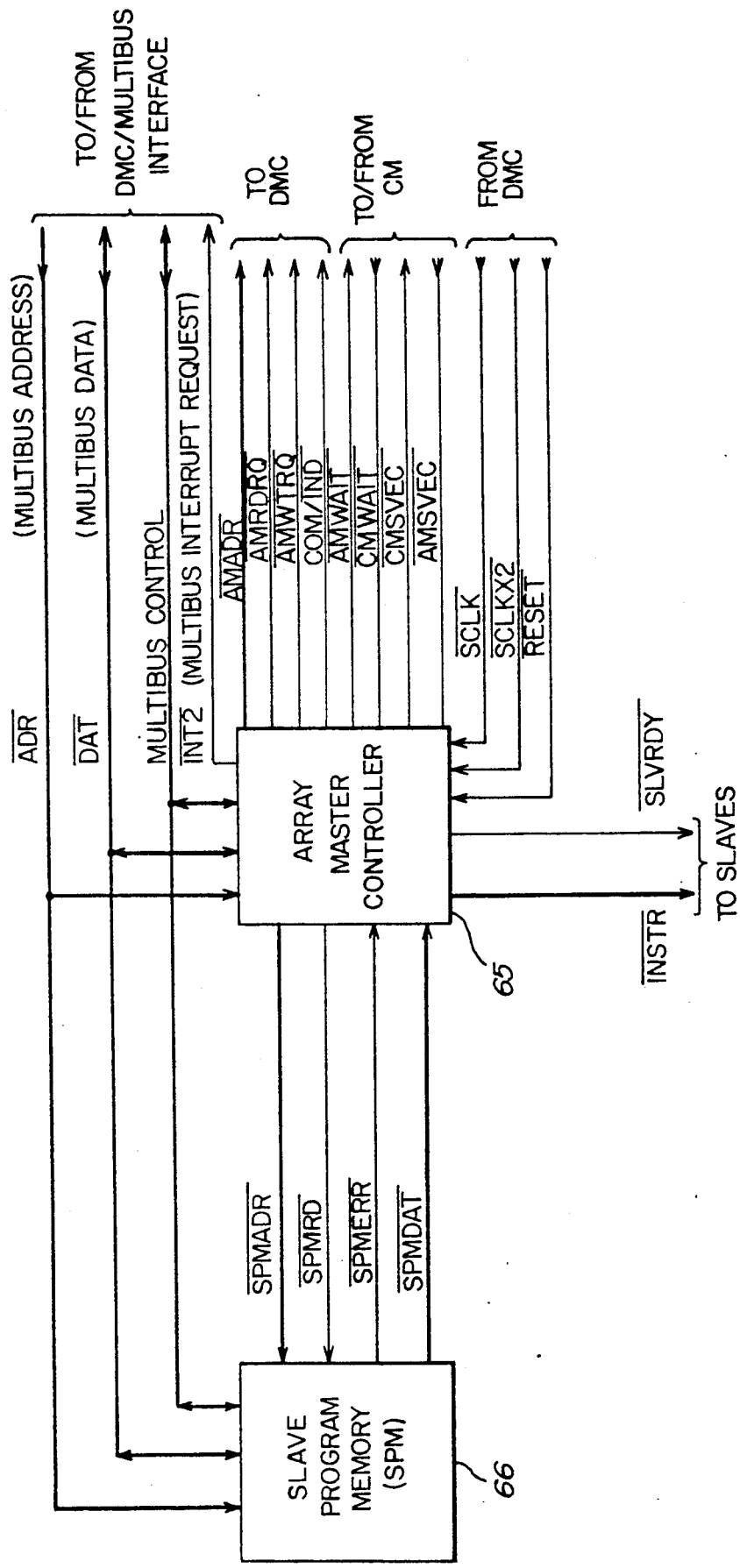
FIG. 6 is a block diagram of the array master in the system of FIG. 1.
Figure 7:
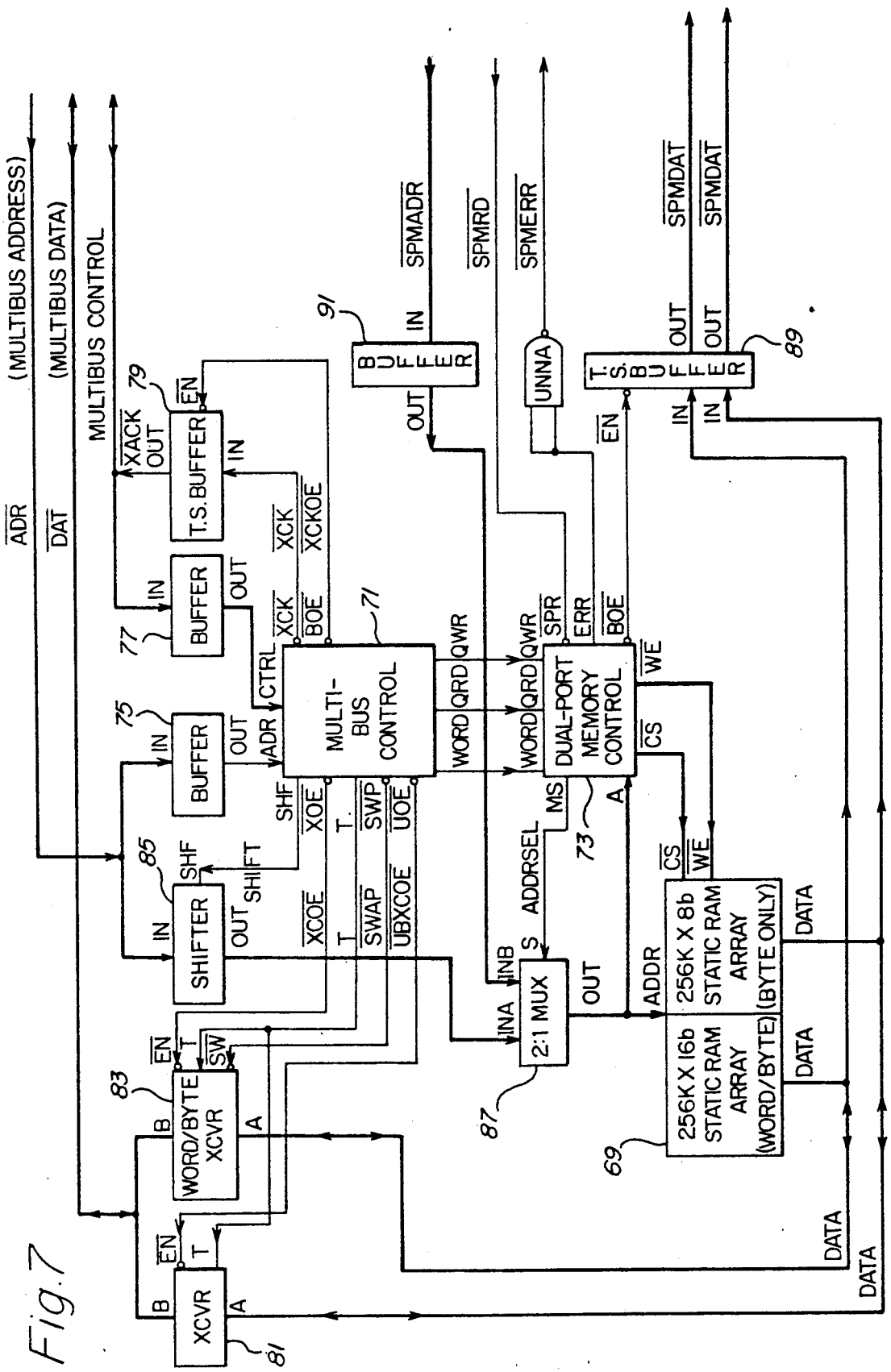
FIG. 7 is a detailed illustration of the slave program memory of the array master of FIG. 6.
Figure 8:
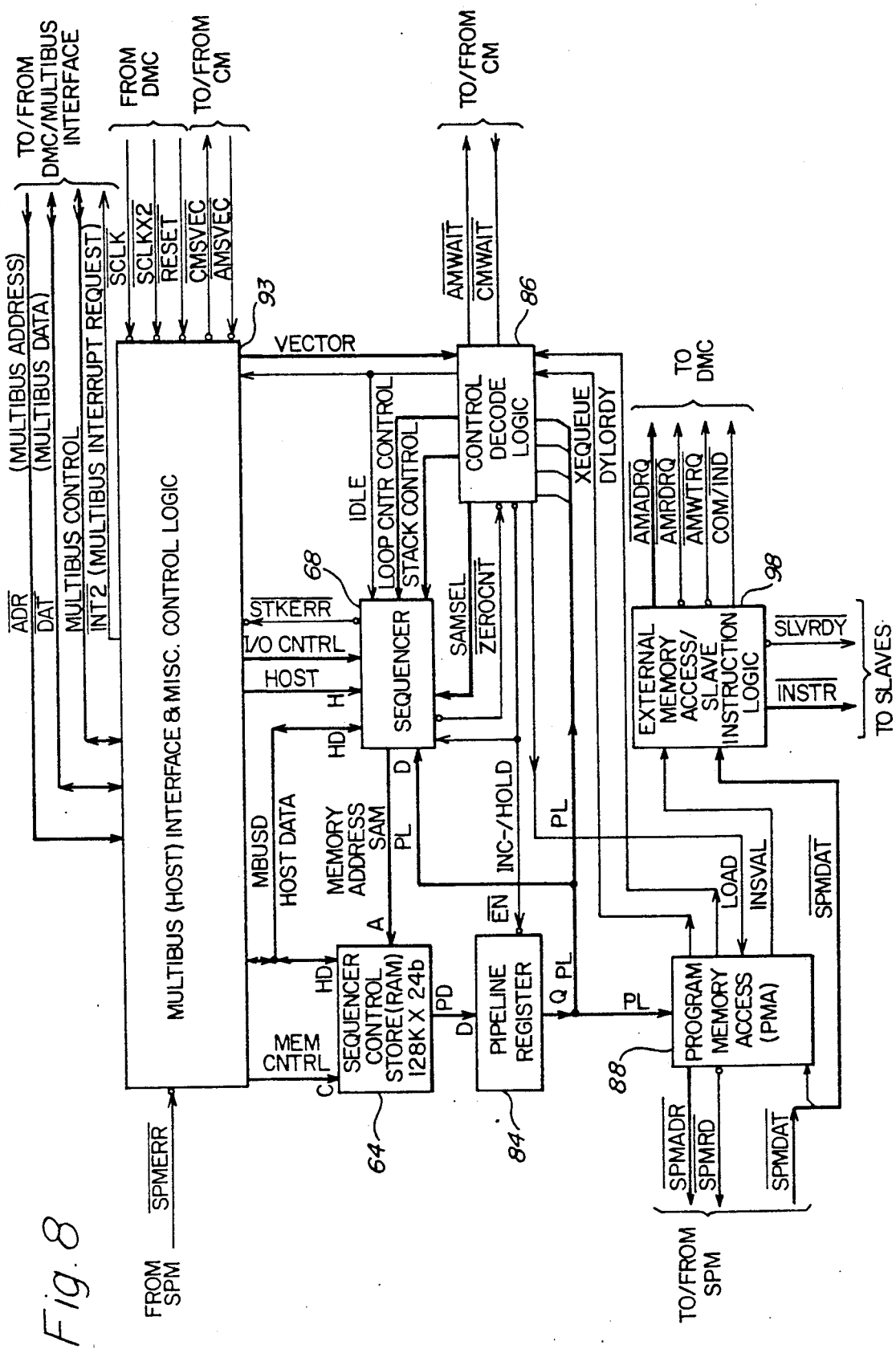
FIG. 8 is a detailed illustration of the array master controller in the array master of FIG. 6.

A block diagram of the AM is shown in FIG. 6. Note it is comprised of the AM Controller 65 (AMC) and Slave Program Memory 66 (SPM). These two main blocks correspond to the physical circuit partitioning. The SPM, FIG. 7 is a 256K-Word dual-ported RAM. The AM Controller, FIG. 8, is primarily a microprogram sequencer 68 with 128K Words of control store (RAM) 64. Both memories are downloaded from the host prior to run time. The SPM 66 contains only the arithmetic instructions, the sequencer RAM 64 only control instructions.

As discussed below in the Software section, the array processor program is preprocessed by the system translator to break the code into control code and computational code sequences. The translator also inserts an XEQ instruction in the control code wherever a block of computational code would otherwise be inserted. The control code sequences are processed at the array processor itself. Computational code sequences are broadcast by the array master to the slaves for processing.

The control code is stored in the sequence program RAM 64. The computational code is stored in the SPM 66. The control code is processed by the sequencer 68. However, when an XEQ instruction is received, that instruction is processed to forward a block of instructions from the SPM 66 to the array slaves. The address portions of those instructions are broadcast to the slaves through the data memory controller 38 of FIG. 1. The sequencer treats the XEQ instruction as a "no operation" and continues on with processing of control code. Thus, processing of control code in the array master and computational code in the slave processors casn proceed simultaneously.

In the SPM, 256K Words of static RAM 69 are dual-ported between the host and AM controller. Only one of the two ports are allowed access at any given time, the AMC having higher priority. Read/write access is available to the host, read-only to the AMC. The host port is a subset of the MULTIBUS I (IEEE-796) standard microcomputer bus; the AMC port is a custom configuration, consisting of 20-bit address and data buses, an access request (SPMRD*) and an error status line (SPMERR*). The 20-bit address provides a maximum of 1M Words of CE code storage. Since an SPM word is 20 bits wide, it occupies 3 bytes of host address space; thus, 3 MB of host address space (400000-6FFFFFh) is reserved for the SPM.

The major circuit blocks of the SPM are MULTIBUS control 71, dual-port memory control 73, and memory 69. The first operates the MULTIBUS (host) interface. Dual-port control 73 arbitrates between host and AMC access requests. Memory 69 is divided into word (16-bit MULTIBUS words) and byte arrays. This arrangement minimizes the amount of host address space required. TMS32020 instructions (16 bits wide) are stored in the word array; the 4-bit control fields are stored in the lower nibble of the byte array.

MUTLIBUS control decodes host addresses and control strobes from buffers 75, 77, issues the host handshake acknowledgement (XACK*) through TS buffer 79, opens and directs the host data transceivers 81, 83, issues access requests to dual-port control 73, and activates/deactivates an address shifter 85. For access to the word array, host address bit 0 is used as an odd-/even byte selector. Byte array accesses enable the host address shifter, which shifts the address one bit to the left. This is necessary to keep the word and byte sections "aligned," i.e., a 32020 instruction and its control field remain together when memory is accessed by the AMC. Note that the SPM, as well as the AMC/CM/DMC, host interface follows the MULTIBUS electrical specification only; the mechanical configuration is completely different.

Dual-port control 73 monitors the requests issued by MULTIBUS control 71 and the AMC, controls an address multiplexer 87, issues SPMERR* and enables the data out buffer 89. SPMRD* goes active for AMC requests, immediately gaining access for the AMC, regardless of host port activity. SPMERR* is activated if any control errors, such as requesting access to nonexistent memory, are encountered. It is driven by an open collector device so that an optional second SPM card can share the line. The multiplexer 87 selects addresses from the host through shifter 85 or from the AMC through buffer 91.

The memory array 69 is comprised of relatively high speed static RAM. As mentioned previously, 1M Word is the maximum capacity of the SPM, of which only 256K is currently provided. The SPM is wired such that the present 8K×8 memory ICs can be replaced by 32K×8 devices to provide the full 1 MW of CE code storage. If more storage is required, but 32K×8 devices are not available, an additional SPM card can be installed to double CE instruction capacity to 512K. Replacement memory ICs should have an address access time of no more than 100 nanoseconds. Since 8-bit wide memory devices are used, the upper nibble of the byte array is unused; it may still be read-written by the host, but is not defined for use at this time. Additions to the control bit field, should they be deemed necessary, can be easily accommodated due to the presence of this memory.

The array master controller(AMC) 65 carries out the main tasks of the AM, as the SPM 66 is simply a large memory accessed by the AMC. Again referring to FIG. 8, the AMC consists of the following circuit blocks: host interface 93, sequencer 68, sequencer control store 64, pipeline register 84, control decode logic 86, program memory access (PMA) 88, and external memory access (EMA) 98. The sequencer, control store, pipeline register and control decode sections form a microprogrammable controller. These four blocks control the interactions of the AMC, via the PMA and EMA sections, with the slaves, CM, and DMC. The host interface provides the means by which the host downloads code, initiates program execution, and monitors the status of the AMC. Detailed descriptions of each block follow.

Much of the host interface 93 is similiar to that of the SPM described above; the same MULTIBUS I subset of signals is used. Sequencer control store is reserved 3 MB of host address space (100000-3FFFFFh). In addition, the AMC interface 93 has various control and status registers mapped to 16 MULTIBUS I/O ports (8000-800Fh), and generates host interrupt requests on INT2*. Table 3 lists each I/O address, whether that port is read/write accessible (R/W) or read-only (R), and its function. Ports 8000-800A will be explained later; ports 800C and 800E give the host access to the Intel 8259A Programmable Interrupt Controller (PIC) residing on the AMC interface. The PIC arbitrates between a number of internally generated interrupt requests, determining which is to be sent to the host via INT2*. The host programs the PIC to the fixed priority scheme shown in Table 4. The miscellaneous control logic section of the block deals with clock and control signals emanating from the CM and DMC.

TABLE 3

| AM I/O REGISTER MAP (MULTIBUS) | | |
|---|---|---|
| I/O ADDR | R/W | FUNCTION |
| 8000 | R/W | AM Vector Register : bits 0 → 7 |
| 8001 | R/W | AM Vector Register : bits 8 → 15 |
| 8002 | R/W | AM Vector Register : bits 16 → 19 (4 lsb's of byt |
| 8003 | | ***** RESERVED ***** |
| 8004 | R | Sequencer Stack @ pointer : bits 0 → 7 |
| 8005 | R | Sequencer Stack @ pointer : bits 8 → 15 |
| 8006 | R | Sequencer Stack @ pointer : bits 16 → 19 (4 lsb's |
| 8007 | R/W | Sequencer Stack Pointer |
| 8008 | R/W | Status Register |
| 8009 | R | HALT ID (LSB of 20-bit HALT instruction operand) |
| 800A | R/W | Command Register |
| 800B | | ***** RESERVED ***** |

TABLE 3-continued

| AM I/O REGISTER MAP (MULTIBUS) | | |
|---|---|---|
| I/O ADDR | R/W | FUNCTION |
| 800C | R/W | 8259A PIC Command/Status Register 0 |
| 800D | | ***** RESERVED ***** |
| 800E | R/W | 8259A PIC Command/Status Register 1 |
| 800F | | ***** RESERVED ***** |

TABLE 4

| AM MULTIBUS (HOST) INTERRUPT PRIORITIES | |
|---|---|
| INTERRUPT REQUEST | NATURE OF INTERRUPT |
| 0 | Sequencer IDLE |
| 1 | CE INSTRUCTION STREAM INVALID (empty) |
| 2 | Sequencer STACK UNDERFLOW or OVERFLOW |
| 3 | Sequencer MEMORY ERROR (see status register description) |
| 4 | CE MEMORY ERROR (see status register description) |
| 5 - 7 | **** RESERVED for future use **** |

Figure 9:
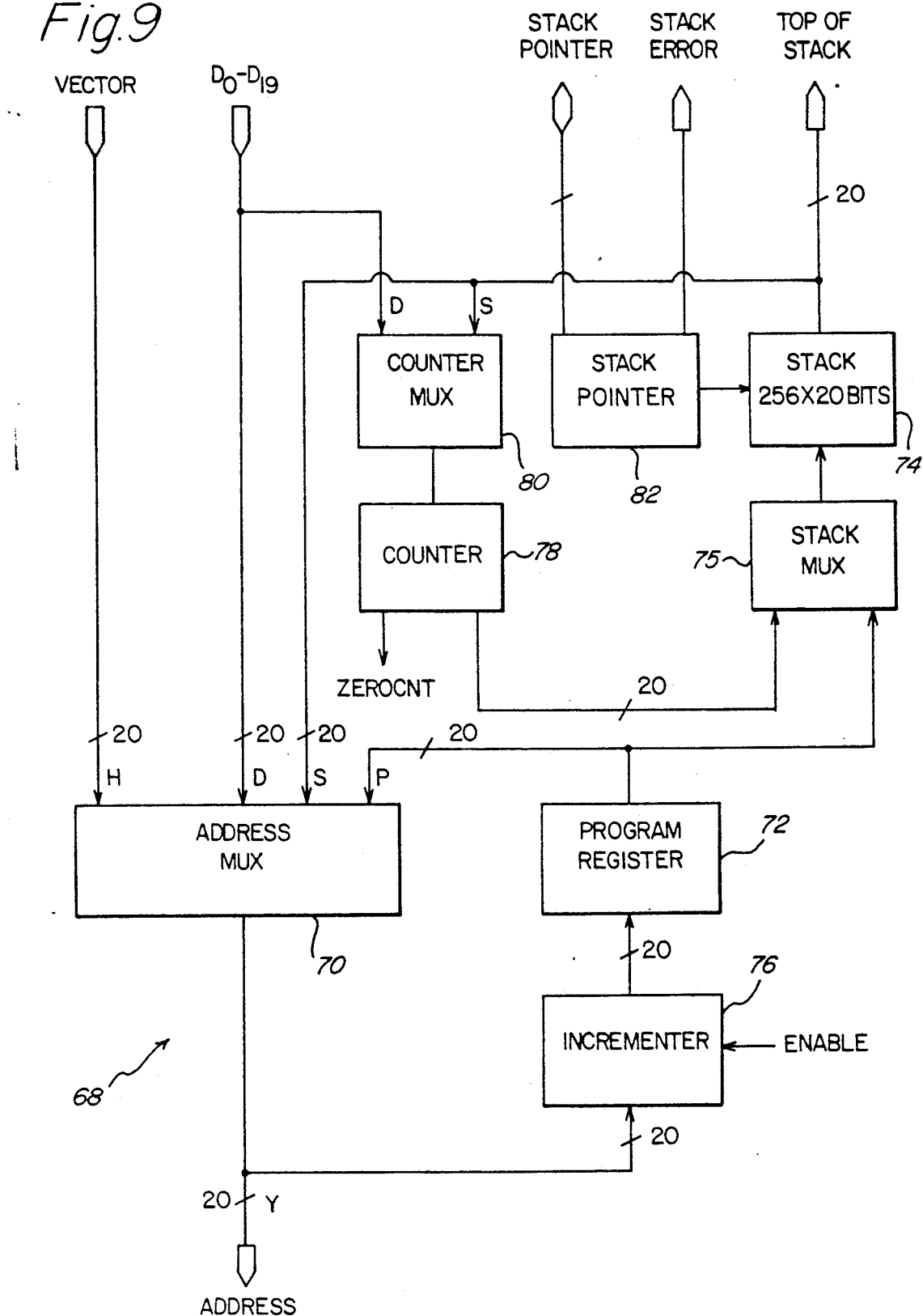
FIG. 9 is a block diagram of the sequencer of the array master controller of FIG. 8.

A sequencer 68, shown in greater detail in FIG. 9, is the heart of the AM. Its principal function is to generate a sequence of addresses into its own control store. Compared to typical sequencer "slice" ICs such as the AMD Am2909/2911, this sequencer is unique in its treatment of the stack; the stack is much deeper and designed to facilitate multiple nested loops.

A control store address is selected by an address multiplexer 70 from one of four sources: P, the program register 72; S, the 255-word stack 74; D, an operand field of the pipelined instruction; or H, the vector/memory address from the host. Two bits from the control decode logic block 86 determine which source is selected. Whenever the sequencer is not executing (IDLE), H is selected to allow the host access to sequencer RAM.

Depending on the nature of the instruction currently in the pipeline register and thus being executed, the current control store address, or the current address plus one incremented by incrementer 76, is presented to the program register 72. For normal sequential program flow, the incremented value is chosen. The ability to enable/disable the incrementer, and to enable/disable the pipeline register clock, give the AM the ability to hold, or loop in place, on a particular instruction.

A 20-bit counter 78 is provided for constructing program loops. It may be loaded via a two input multiplexer 80 from D, which contains the loop count for LOOP instructions, or from the stack. The counter outputs are tied to one of the two inputs of the stack input mux 75. The ability to load the counter from the stack and to push the counter onto the stack permits nesting of loops. ZEROCNT*, the counter status signal, goes low when the counter is at zero. The logic level of ZEROCNT* determines whether a loop is repeated or terminated.

The sequencer stack 74 is 255 words deep. This is much deeper than a typical sequencer, allowing many levels of nested loops and subroutine CALLs. Both the top of stack (TOS) and stack pointer 82 are accessible from the host; refer to Table 3 for their I/O assignments. The host can read the entire stack by multiple iterations of reading the TOS and incrementing the pointer. Host access of TOS and pointer are denied when the AM is executing. Should the stack pointer overflow or underflow, it sends an error signal to the Intel 8259A PIC in the interface 93 which generates a host interrupt. Note the sequencer is also immediately forced to an IDLE state on an under/overflow.

The stack 74 itself is constructed from 256-word high-speed static RAMs. The stack pointer 82 comprises an 8-bit loadable counter, an incrementer and a two-input mux. The mux output is the stack memory address. The mux selects between the counter output and the output plus one; thus, two pointers that track each other, and are always one count apart, are provided. The non incremented value is used as the POP (read) address; the incremented counter output is the PUSH (write) address. The counter begins at zero and counts up (1,2,3, . . .) as values are pushed onto the stack; POPs count down. Attempts to increment the counter beyond 255 or decrement it below 0 result in stack overflow or underflow, respectively. Due to this implementation, only 255 stack locations, 1 through 255, are actually available; stack memory at address 0 is never used. The TOS available to the host is the POP address; the host reads/writes the counter directly.

The AM instruction set is listed in Table 5.

TABLE 5

| AM Instruction Set | |
|---|---|
| INSTRUCTION | CODE |
| HALT | 000000H |
| NOP | 100000 |
| SYNC | 200000 |
| RETURN | 300000 |
| REPEAT LOOP | 400000 |
| PUSH COUNTER ONTO STACK | 500000 |
| POP COUNTER OFF STACK | 600000 |
| XEQ (CE ADDRESS) | 7-ADDR (20 BITS) |
| JUMP (SEQUENCER ADDRESS) | 8-ADDR (20 BITS) |
| CALL (SEQUENCER ADDRESS) | 9-ADDR (20 BITS) |
| LOOP (N+1 TIMES) | A-N (20 BITS) |

The instructions NOP, CALL(@ADDR), JUMP(@ADDR), and RETURN are conventional. They allow the usual transfers of control within the sequencer space. CALL causes a return address to be stored on the stack and RETURN retrieves that address. The HALT instruction stops execution by the AM and also notifies the host via the IDLE signal. The sequencer supports a convenient looping instruction, LOOP N, which causes code up to (and including) the next REPEAT LOOP instruction to be repeated N+1 times. Nesting of loops requires that the contents of the single counter be saved on the stack and later retrieved. The instructions PUSH COUNTER and POP COUNTER are provided for that purpose.

The SYNC instruction allows coordinated operation of the AM and CM, i.e., of computation and inter-slave communication. If the AM and CM are each executing code, the first to reach a SYNC instruction will be held until the other also reaches a SYNC. They then both proceed. If at all possible, code is to be written so that the AM never waits for the CM.

XEQ is the only AM control instruction which refers to the CE code space. It causes a block of computational code, at least two words long, to be broadcast sequentially to the slaves. The terminate bit (FIG. 3) in the next to last word of the block is set to terminate the transfer. As far as the AM sequencer is concerned, XEQ is simply a NOP. i.e., there is no control transfer and the next sequential instruction is fetched. Thus, the AM sequencer continues to process control code as computational code is broadcast to and processed by the slaves.

Instruction opcodes B through F are not defined at this time. In order to minimize unpredictable performance, they are coded to function exactly the same as a HALT. Should additional instructions be deemed necessary in the future, the control decoding PROMs can be easily modified to accommodate them.

Examination of FIG. 8 reveals how AM instructions are executed. The sequencer 68 provides addresses to the sequencer control store 64, causing instructions to be written to the pipeline register 84. These instructions are 24 bits wide. The most significant 4 bits form the opcode field, specifying the nature of the instruction. The instruction set is described above. The 4-bit opcode is sent to the control decoder 86, where the control signals necessary for execution of the encoded instruction are generated. These signals control the stack, address mux, loop counter, program register incrementer, pipeline register and PMA, as well as provide operation status to the host interface and SYNC status to the CM. Table 6 indicates the control of these various components as a function of the executed instruction. The control decoder thus serves a role similar to that of the AMD Am29811 next-address control unit, implementing the AM's custom instruction set. Note that control flow is that of a typical pipelined microprogrammed controller; the next instruction is being fetched while the current instruction is executing. The remaining 20 bits of the sequencer instruction are used, in certain instructions, to specify addresses in sequencer RAM, addresses in slave program memory, or the number of times a loop is to be repeated.

TABLE 6

| AM SEQUENCER CONTROL | | | | | | |
|---|---|---|---|---|---|---|
| INSTRUCTION | ADR MUX | STACK | LOOP CNTR | IPR | IDL | WAITING |
| HALT | H | HOLD | HOLD | N | Y | N |
| SNOP | P | HOLD | HOLD | Y | N | N |
| SYNC - XEQ active 1 (hold) | P | HOLD | HOLD | N | N | N |
| - CM not waiting * XEQ inactive 1 | P | HOLD | HOLD | N | N | Y |
| - CM waiting & XEQ inactive 1 (go) | P | HOLD | HOLD | Y | N | Y |
| RETurn from CALL | S | POP | HOLD | Y | N | N |
| REPL - loop count <> 0 | S | HOLD | DECR | Y | N | N |
| - loop count = 0 (end) | P | POP | HOLD | Y | N | N |
| PSHC (loop cntr → TOS) | P | PSH C | HOLD | Y | N | N |
| POPC (TOS → loop cntr) | P | POP | LOAD S | Y | N | N |
| XEQ - PMA ready 2 (go) | P | HOLD | HOLD | Y | N | N |
| - PMA not ready 2 (hold) | P | HOLD | HOLD | N | N | N |
| JUMP to address X | D | HOLD | HOLD | Y | N | N |
| CALL routine at address X | D | PSH P | HOLD | Y | N | N |
| LOOP N+1 times | P | PSH P | LOAD D | Y | N | N |

TABLE 6-continued

| | AM SEQUENCER CONTROL | | | | | |
|---|---|---|---|---|---|---|
| INSTRUCTION | ADR MUX | STACK | LOOP CNTR | IPR | IDL | WAITING |
| Instruction codes B → F 3 | H | HOLD | HOLD | N | Y | N |
| ****** HARDWARE VECTORING ****** | | | | | | |
| VECTOR to address X | H | HOLD | HOLD | Y | N | N |
| VECTOR w STACK PUSH to address X | H | PSH P | HOLD | Y | N | N |
| SEQUENCER STK ERROR (HALTs seq.) | H | HOLD | HOLD | N | Y | N |

KEY:
P = Program Register
D = Data field within instruction
C = Loop Counter
IPR = Increment Program Register
IDL = Sequencer IDLE
H = Host
S = Stack
Y = Yes
N = No
NOTES:
1. The XEQ queue is considered active if either the PMA register OR PMA counter OR instruction stream are active (valid).
2. The PMA is not ready if both the register AND counter are valid - the queue is full.
3. These codes are undefined - they behave the same as HALTs.

When JUMP or CALL instructions are executed, a 20-bit number specifying an address in the sequencer control store is applied to the D input of the sequencer address mux. D is selected as the address mux output, thus the 20-bit operand specifies the address of the next instruction to be fetched. Execution of a LOOP instruction applies a 20-bit count value to the D input, but D is not selected as the address mux output; instead, the D value is loaded into the loop counter. When an XEQ instruction is executed, the sequencer does not use the D value at all. That 20-bit value, which specifies the starting address of a block of CE code residing in the SPM, is latched into the input of the program memory access (PMA) block 88. Normally, the sequencer continues on to th next instruction following an XEQ; however, should the PMA's 2-deep queue be full, execution will hold until the currently executing XEQ code segment finishes.

The SYNC instruction is supported by providing CMWAIT* as an input and AMWAIT* as an output of the control decode section. When the AM encounters a SYNC instruction, it tests the status of the XEQ queue and CMWAIT*, the CM SYNC indicator. If any XEQ segments are executing or pending, the AM holds at the current sequencer location and keeps AMWAIT* at a logic high. Keeping AMWAIT* high prevents the CM from advancing beyond its corresponding SYNC point. XEQ queue status must be taken into account to insure that any and all CE instructions, corresponding to XEQs occurring before the SYNC, are executed before the CM is allowed to continue. If the XEQ queue is empty, AMWAIT* is activated. If CMWAIT* is not active, the AM holds in place until the CM signals that it is waiting. When the CM arrives at the matching SYNC point, it pulls CMWAIT* low, allowing both the AM and CM to proceed.

Vectoring is the process by which the host initiates AM operation. The host first writes a 20-bit value into the AM vector register (AMVR), I/O ports 8000h through 8002h (refer to Table 3). This 20-bit quantity is the starting address in sequencer memory of a desired AM control program. The host then issues a command to the AM command register. Execution begins immediately after the issuance of the command. Four commands are currently defined: VECT, VECP, NOP AND AUTO-VECTOR. VECT is the "normal" form of the command, and will be used most often. VECT causes the sequencer to immediately jump to the address specified in the vector register and begin execution with the instuction found there. VECP functions the same as VECT, additionally pushing the current program register contents onto the sequencer stack. VECP is used primarily for debugging purposes. A NOP does exactly nothing, as one would assume.

Normally, the host issues a vector command, then waits for the AM to complete its task. The host is notified by activation of the Sequencer IDLE interrupt (Table 4). Even with a real-time operating system, the host's delay in issuing the next vector after receiving the interrupt can be relatively long; AUTO-VECTOR is a special mode of operation by which the delay can be eliminated by queueing vectors. Issuing an AUTO-VECTOR command causes the sequencer to execute a VECT immediately upon entering the IDLE state. Therefore, the AM can be directed to execute consecutive vectors, with no intervening time delay, by loading the AMVR with the first vector and issuing a VECT command, then immediately loading the next vector and issuing an AUTO-VECTOR command. AUTO-VECTOR acts exactly as a VECT if issued while the sequencer is IDLE. The host can query AUTO-VECTOR status via the Auto-Vector Pending bit in the AM Status Register. Stack errors force the sequencer to a HALTed state, clearing any pending AUTO-VECTORs.

The CM can optionally be issued commands via the AM command register. Conversely, AM and/or CM can be vectored from the CM command register. This option was included so that both could be started simultaneously (within one sequencer clock cycle of each other). This explains the existence of the NOP command, which must be specified whenever issuing a command for one master while desiring the other's state to remain unchanged.

Figure 10:
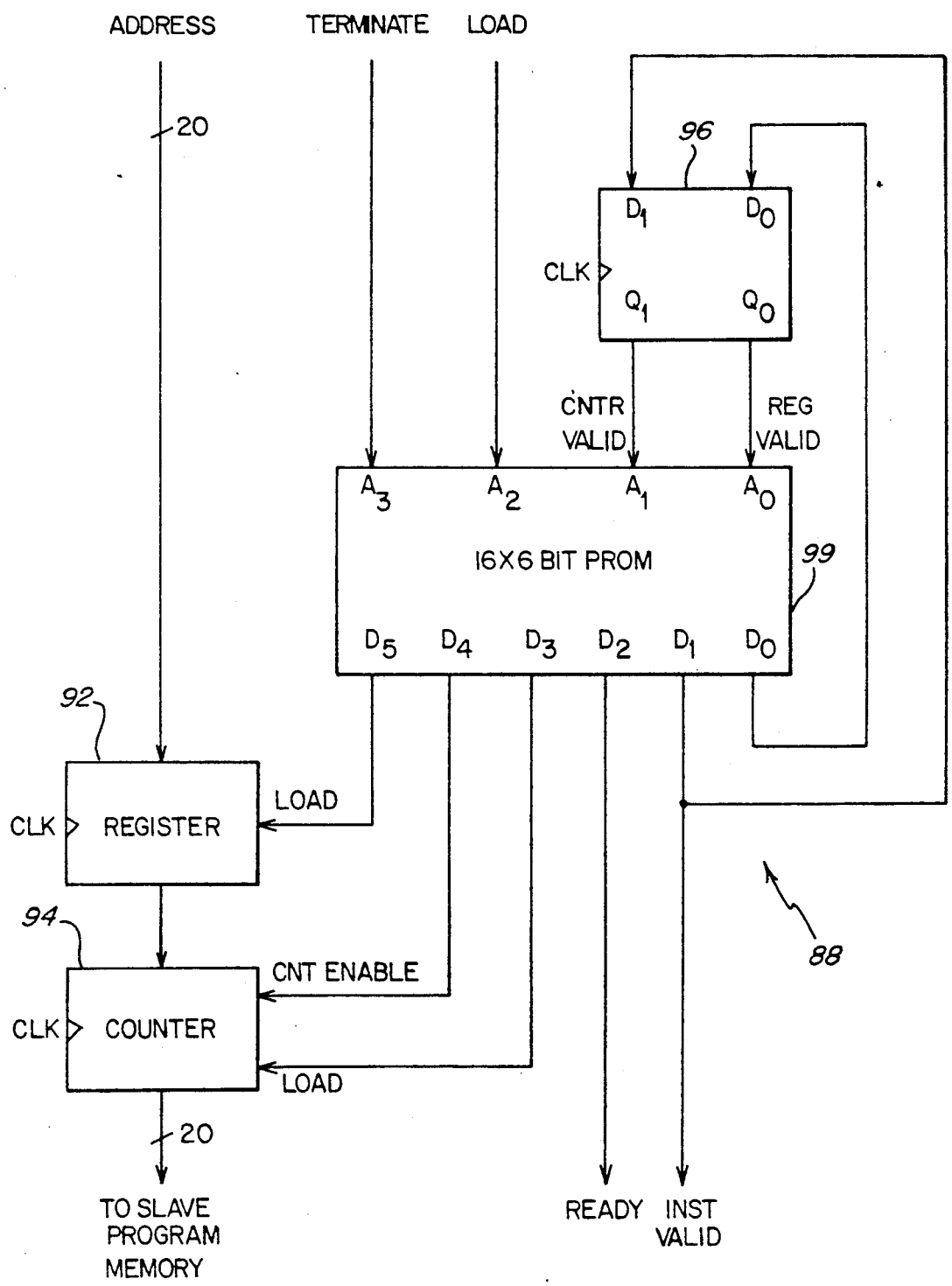
FIG. 10 is an illustration of the program memory access of the array master controller of FIG. 8.

The PMA (Program Memory Access) 88 subsystem, detailed in FIG. 10, controls the actual execution of XEQ instructions. As mentioned above, the sequencer presents the starting address of a block of CE code to the PMA and then, typically, begins executing its next instruction. Note that this method of distributed control is unique to XEQ; all other AM instructions are completely controlled by the control decode subsystem. The PMA accomplishes its task by queueing the starting address values and transmitting corresponding sequential streams of addresses to slave program memory (SPM) 66. Data from the SPM is handled by the EMA circuit block 98 described below. The PMA contains a 20-bit register 92, a 20-bit loadable counter 94, and a finite-state controller consisting of a 2-bit state register 96 and a 16-word by 6-bit PROM 99.

When an XEQ instruction is decoded by the AM, the address (sequencer D) field is loaded into the PMA register 92. If no CE instructions are currently being executed, the address is passed on to the counter 94 at the next active clock edge. A sequence of addresses in the CE code space 66 is then generated by the counter. The sequence terminates when a set bit is detected in the terminate field of a CE instruction. Since the terminate bit is latched, it must be set in the next-to-last word of a code block. If the counter is busy when the XEQ is decoded, the address field is held in the register 92. When the current sequence terminates, the contents of the register are loaded into the counter 94 at the next active clock transition and the next block of CE code is accessed. The 2-bit state register 96 represents the internal state of the PMA. One bit reflects the validity of the contents of the address register while the other reflects the validity of the contents of the counter. These two bits are logically ORed to form the XEQUEUE status signal used by the control decode section of the AMC. The OR of the two bits also forms SPMRD*, the SPM access control signal.

Figure 11:
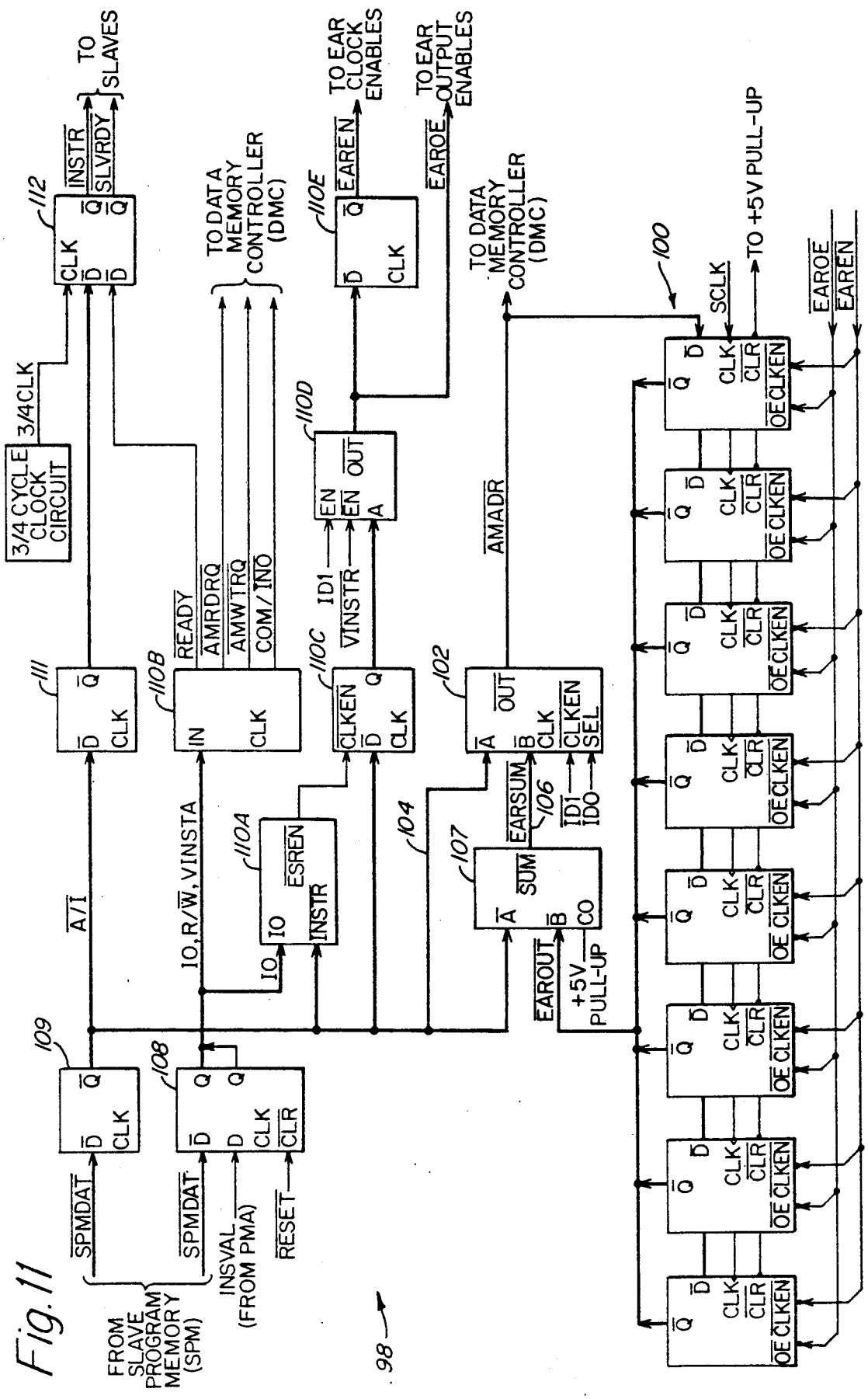
FIG. 11 is a detailed illustration of the external memory access of the controller of FIG. 8.

The remaining AM function is the generation of addresses for accessing slave external data memory 42. This is accomplished by the EMA (external memory address) circuit 98 of FIG. 11.

To support the incremental addressing mode, the EMA makes use of eight multiplexed address registers 100, each of which can be used to either read or write external data memory.

Each register has two sources of data through a multiplexer 102, the contents 104 of an address field, or the result 106 of adding the contents of the address field to the previous contents of the register by adder 107. A register is initially loaded when the data memory is directly addressed in the corresponding direction. Subsequent incremental addressing causes the previous address to be altered by the amount (positive or negative) specified in the address field of the instruction. This field is not native to the TMS32020 instruction set but is provided as an enhancement. The mechanism chosen for utilizing this additional field exploits certain characteristics of TMS32020 operation.

Data movement and arithmetic instructions of the TMS32020 occupy a single word, but take two cycles for execution when external data memory is specified. This provides an empty slot in the CE stream into which an external data address or address increment may be inserted. This word is ignored by the CEs since, when the address field arrives, their data buses are connected to the external memory and not to the instruction. Instead, this field is used by the EMA to generate an address to be sent via the DMC to the external data memories.

The instruction stream sent to the array is fully deterministic in the sense that it does not depend upon the results of any array computation. It is therefore possible to look upstream, anticipating an instruction prior to its arrival at the array. The 20-bit register 108, 109 in FIG. 11 accomplishes this function. When the decode circuit 110A-E senses an instruction referring to external data memory, the EMA knows that the next word is a direct memory address or that it is an increment to be applied to a previous address. But the EMA need not wait for the next word to arrive since that word presently exists as input to the 20-bit register. Thus the nature of the instruction and the value of the address field, present in the instruction stream as successive words, are simultaneously available for the appropriate address computation.

The final EMA component, the registers 111 and 112, serves simply to delay the instruction stream to the array, allowing the addresses to arrive at the data memory sufficiently early to meet the access time requirements of relatively slow memory. The 17th bit, READY, notifies the CEs when the instruction stream runs dry, a circumstance usually to be avoided by proper programming.

COMMUNICATION MASTER

Figure 12:
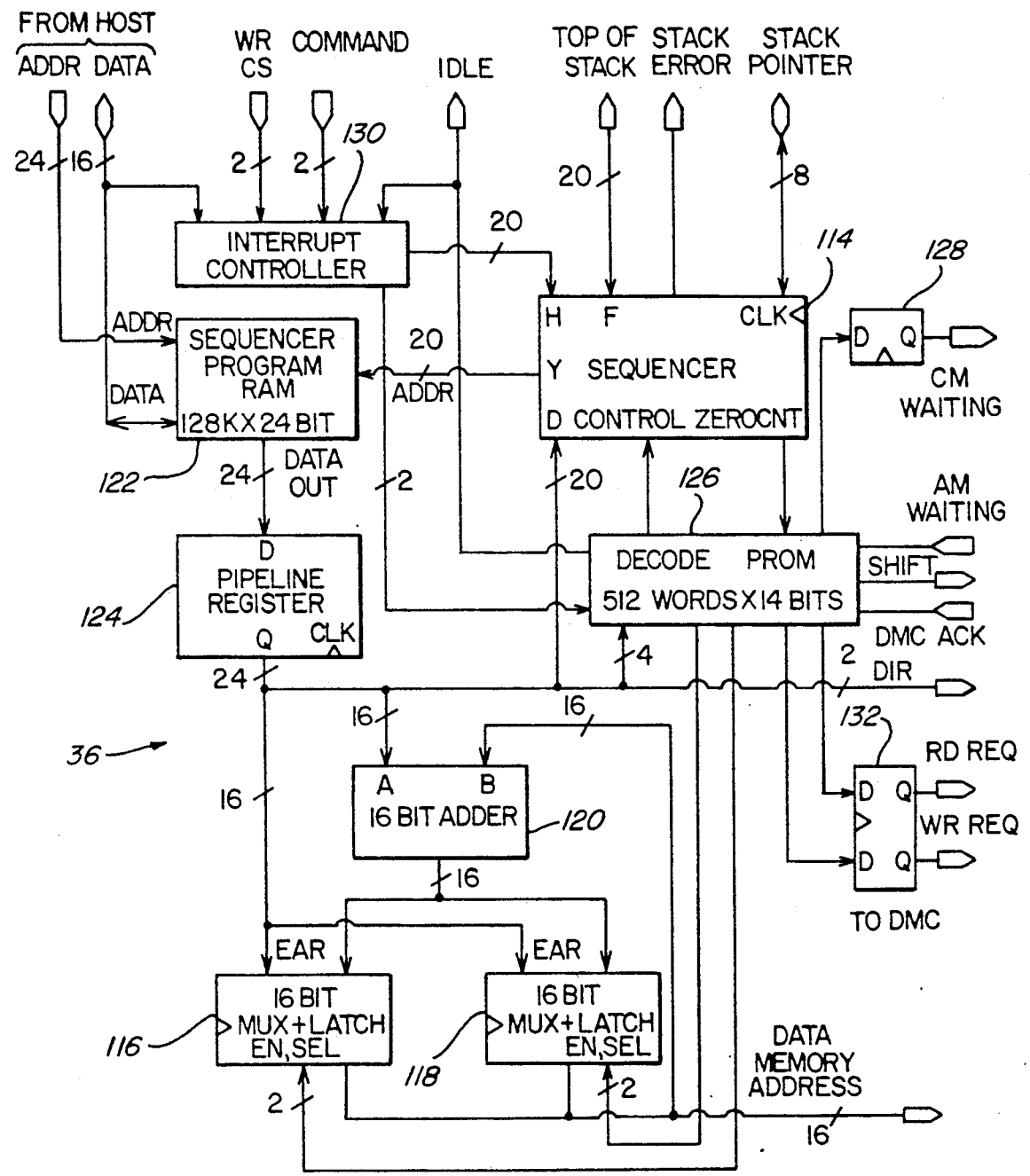
FIG. 12 is an illustration of the communication master in the system of FIG. 1.

Inter-slave communication is managed by the CM (FIG. 12), a processor which is similar to but somewhat simpler than the AM. The CM uses an almost identical sequencer 114 and executes the same set of control instructions. It is controlled by the host in the same way. The CM is completely independent of the CEs and makes no use of the XEQ instruction. Instead, it executes five unique instructions related to moving data from slave to slave.

The CM instruction set includes commands to transfer data between external data memory 42 and the communication registers 46. Two auxiliary address registers 116, 118, are provided, one for each direction of transfer between the external data memory and the communication register. Both direct and, with adder 120, incremental addressing modes are supported. In all cases a common local address is distributed to all slaves. The CM includes a sequence program RAM 122, pipeline register 124, decode PROM 126, and interrupt controller 130 like those in the AM. It also includes a CM waiting flip-flop 128 and a flip flop 132-provides the read and write requests to the DMC directly from decode PROM 126.

The CM instruction set is shown in Table 7.

TABLE 7

| CM Instruction Set | |
|---|---|
| INSTRUCTION | CODE |
| HALT | 000000H |
| NOP | 100000 |
| SYNC | 200000 |
| RETURN | 300000 |
| REPEAT LOOP | 400000 |
| PUSH COUNTER ONTO STACK | 500000 |
| POP COUNTER OFF STACK | 600000 |
| JUMP (SEQUENCER ADDRESS) | 8-ADDR (20 BITS) |
| CALL (SEQUENCER ADDRESS) | 9-ADDR (20 BITS) |
| LOOP (N+1 TIMES) | A-N (20 BITS) |
| SHIFT (DIRECTION) | B-DIR (2 BITS) |
| LOAD DIRECT (DATA MEM ADDR) | C0-ADDR (16 BITS) |
| STORE DIRECT (DATA MEM ADDR) | D0-ADDR (16 BITS) |
| LOAD INCREMENTAL (ADDR INCR) | E0-INCR (16 BITS) |
| STORE INCREMENTAL (ADDR INCR) | F0-INCR (16 BITS) |

The first 10 instructions are common to the AM and were discussed above. As noted above, the SYNC instruction provides the means to coordinate computation in the array with inter-slave communication.

In order to move a word of data from one slave to another, the word is first transferred from the external data memory 42 of the source slave to its communication register 46. This is accomplished by either the direct or incremental form of the LOAD instruction. If the direct form is selected, the 16-bit field represents a specific address in external data memory. If the incremental form is selected, the 16-bit field represents the increment to be applied to the last address referenced in a transfer in the same direction.

The contents of the communication register are next moved from slave to slave by a series of SHIFT instructions, one per inter-slave transfer. Each SHIFT requires a 2-bit argument specifying the direction of movement. Finally, the word to be communicated is transferred from the communication register to the external data memory at the destination slave. This is accomplished by either form of the STORE instruction.

DATA MEMORY CONTROLLER

Figure 13:
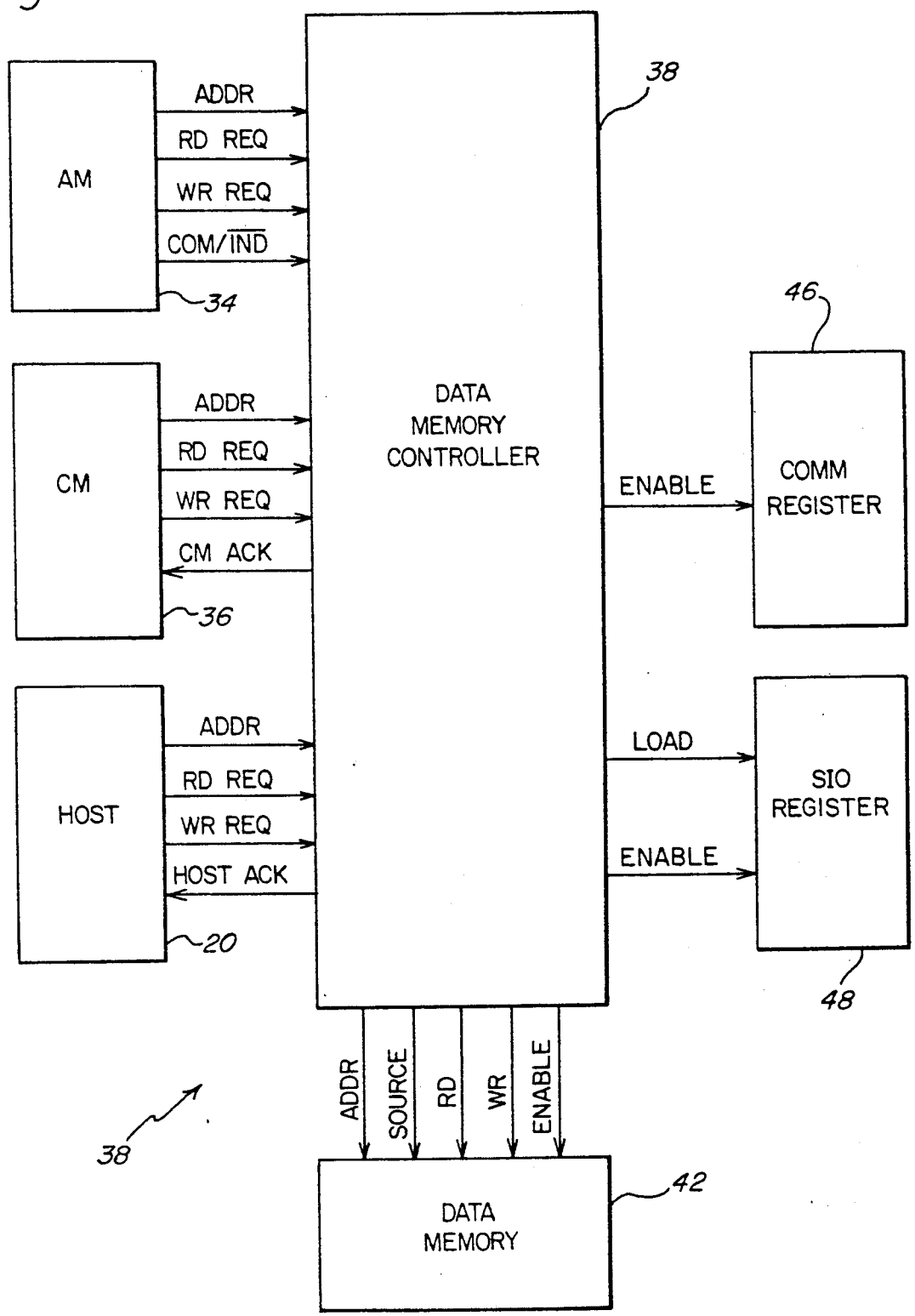
FIG. 13 is an illustration of communications between the data memory controller and other elements of the system of FIG. 1.

The DMC 38 (FIG. 13) is a relatively simple but central component. When requested by the AM, CM or host, the DMC generates addresses in external data memory as well as the necessary control signals (READ and WRITE). A major responsibility of the DMC is to arbitrate these requests. It assigns first priority to the AM, second priority to the CM, and third priority to the host. The AM never waits for access as the CM and host may. Thus, only the latter two require READY inputs to inform them that they have gained the DMC's attention.

A read or write request by the CM or host is actually a request to transfer data between external data memory 42 and the communication or serial I/O registers 46, 48. Accordingly, the DMC generates the control signals (ENABLE or LOAD) for these registers as well as for the memory.

THE HOST

The host computer 20 manages the real-time coordination and control. It transfers data from mass storage to the array for processing and from the array to a high resolution color monitor 26 for display. In addition, it may be used as an independent system for program development. The host runs under the Intel RMX 286 operating system, which is specifically designed to handle multiple tasks in an interrupt-driven, real-time environment.

The host is a high performance controller using as many commercially available products as possible. The result is that only one host subsystem, the Serial I/O (SIO), is a custom design.

Figure 14:
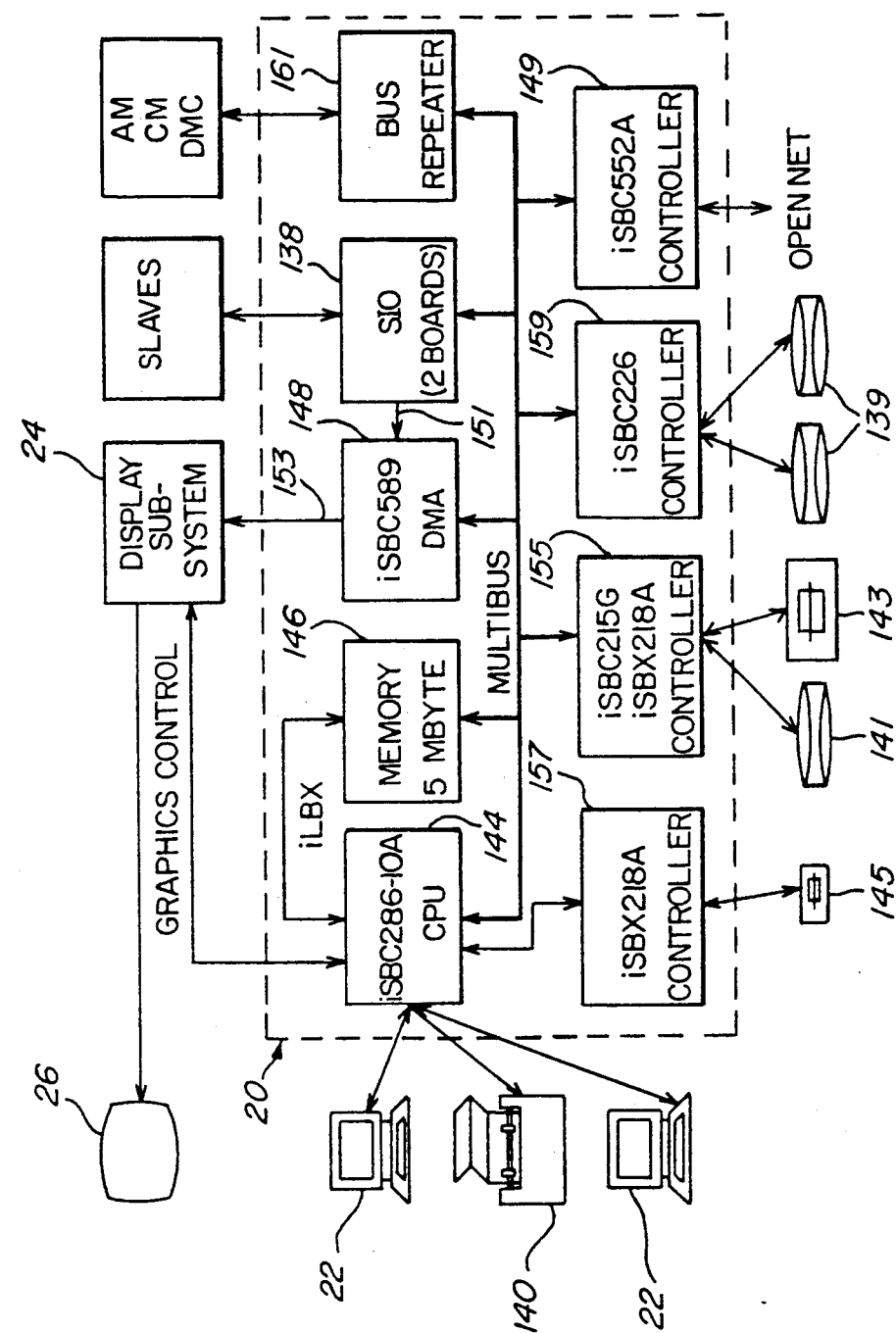
FIG. 14 is a block diagram of the host processor in the system of FIG. 1.

As shown in FIG. 14, the host comprises an Intel 286/380 commercial microcomputer 144 to which a number of commercial circuit boards and the custom SIO subsystem 138 have been added. The SIO subsystem contains one link for each of the eight serial data channels which connect the host to the array. This subsystem consists of two custom MULTIBUS boards.

The host is provided with a number of standard computer peripherals: an 80 MB removable hard disk 139, a 35 MB fixed disk 141, an 8-inch floppy disk drive 143, a 5¼-inch floppy disk drive 145, a video display system 24, a printer 140, user terminals 22, two RS 232 serial data links and an optional local area network capability.

The host architecture is a multiple-bus structure, composed of the industry standard MULTIBUS (IEEE 796) and three expansion buses. The four-bus design provides high performance by offloading certain operations onto specialized bus structures. The four buses work in parallel. All four can be used concurrently to provide a substantially higher throughput than that of a single-bus architecture.

As dipected in FIG. 14, the main or system host bus is the MULTIBUS which is a general-purpose channel used to download code from mass memory to the AM and CM prior to execution. The MULTIBUS is also used to transfer data between mass memory and the array (via serial I/O 138), as well as transfer control and status information between the various host subsystems. The host MULTIBUS provides a memory address space of 16 MB (i.e., a 24-bit memory address).

The Local Bus Extension (LBX) extends the host CPU's on-board local bus to other boards. This provides a high-speed, arbitration-free path between the host CPU 144 and system memory 146, allowing the CPU, the primary master, access without the overhead of MULTIBUS contention. The LBX bus will be used exclusively for host CPU memory space expansion. It provides full 24-bit addressing and is a 16-bit data bus.

The I/O expansion bus 151 provides additional "plug in" I/O capabilities to existing boards. Used in a slightly unorthodox manner here, the SBX forms a data path that offloads graphics traffic from the MULTIBUS. This allows concurrent DMA transfer of display data from the slaves to host mass memory and to the graphics display. The DMA controller 148 (SBC 589) views the SBX module as a 16-bit I/O port.

The peripheral I/O bus 153 (MULTICHANNEL) provides a separate high-speed I/O DMA path. Its purpose is to transmit display data received over SBX to the physically separate graphics subsystem. The DMA controller 148 (SBC 589) serves a MULTICHANNEL supervisor. An SBC 580 is the receiving device in the graphics subsystem 24.

The heart of the host is an Intel SBC 286/10A CPU board 144 including a 80287 co-processor for math support. The CPU operates under RMX 286 to coordinate all system activities. It primarily delegates responsibility for system operation to the various host subunits and slave array controllers, providing them with operating parameters and control information in proper sequence.

The CPU directly communicates with the outside world via a user terminal 22, RS-232C links to a data source and the display system 24, and a parallel port to a line printer 140. It also serves as a MULTIBUS master and primary LBX bus master. SBX connectors provide I/O expansion capability.

CPU on-board memory consists of 64 KB EPROM which contains RMX boot, SDM monitor and a system confidence test. Four (expandable to 8) JEDEC 28-pin sockets are provided for installation of up to 64 KB of on-board.

The CPU subsystem contains a 5 MB error-corrected Dynamic Random Access Memory (DRAM). The error correction circuitry employs a modified Hamming code (6 bits check per 16 bits of data) which detects single and double bit errors and corrects single errors. The error correction can be disabled, if desired.

A 8 MHz Intel 80286 is the CPU's microprocessor. Running in its protected address mode, the CPU accesses a 24-bit (16 MB) address range. Note that the memory used by the host is divided between the zeroth page and the tenth. Note also that although sockets are provided to add RAM to the CPU card itself, all host CPU RAM currently resides off-board on the Intel SBC 010EX and SBC40EX dual-ported RAM cards. Dual-porting of the 5 MB of error corrected DRAM provides the CPU with a large "off-board local" memory, while also allowing other MULTIBUS masters access to that memory. In order to avoid any confusion, note that the CPU accesses the memory only over LBX, and never over MULTIBUS. All other masters gain access only over MULTIBUS. Detailed specifications and operating instructions can be found in the iSBC 286/20A and iSBC 012EX/010EX/020EX/040EX hardware reference manuals.

Host mass memory is available in a number of forms dictated by the type of data to be stored. For host system software, the primary storage is a 35 MB Winchester disk drive 141. For backup and operating system software updates, an 8-inch RMX format 1 MB DSDD floppy disk drive 143 is used. The controllers 155 for these two disk drives are the Intel SBC 215G Winchester Controller and the SBX 218A flexible disk controller (mounted on the 215G board). Both of these mass storage units are part of the Intel 286/380 microcomputer. A 5½-inch DSDD floppy disk drive 145 has been added to the host computer. A SBX 218A flexible disk controller board 157 added to the CPU card is used with this disk drive. The 5½-inch medium is used to transfer software to and from IBM PCs which are being used for software development. The 5½-inch disk controller also supports RMX format diskettes. Two 80 MB removable hard disk drives 139 (CDC 9710 RSD) are also part of the host mass storage. This device is used to store data which will be processed by the slave array. An Intel SBC SMD controller 159 is used for this drive.

High-speed DMA capabilities are provided by the Intel SBC 589 intelligent DMA board 148. Acting as MULTIBUS master and the MULTICHANNEL supervisor, it executes DMA transfers between any combination of MULTIBUS (memory and I/O), MULTICHANNEL, and two SBX interfaces. The 589's role is to transfer processed slave data from the SIO 138 to the graphics subsystem 24. It operates in a manner similar to that of the 215G, except that the parameter blocks (the 589 has two DMS channels) and wake-up "ports" reside in 8 KB of on-board RAM. Again, the host CPU supervises the activity.

Processing results are graphically depicted on color display 26. Accepting data from the SIO 138 over the MULTICHANNEL bus 153, the graphics subsystem 24 properly converts processed slave data into a form recognized by a color monitor. Video characteristics are as follows: a raster-scan screen format of 512 horizontal×512 vertical pixels, 256 displayable colors at any given tiem (8 bits/pixel), 60 Hx non-interlaced fram rate and RS-343 compatible RGB composite (sync on green) analog video signals. In addition, an interface to a color printer is provided. The graphics subsystem consists of a Matrox SX900 Graphics processor, a 2 MB memory board, an Intel SBC 580 MULTICHANNEL interface (functions as a MULTICHANNEL slave) and an Intel SBC 18603A CPU board.

The communication link between the physically separate host and slave array masters (AM, DMC, CM) is established by a commercially available product, the PROCISE 796 BUS REPEATER 161. Consisting of one MULTIBUS card (MBH-660) interconnected by twisted-pair cables, this transceiver product extends the host MULTIBUS to the AM, CM and DMC. Full paths are extended, including 24 address, 16 data, and 8 interrupt request lines.

Figure 15:
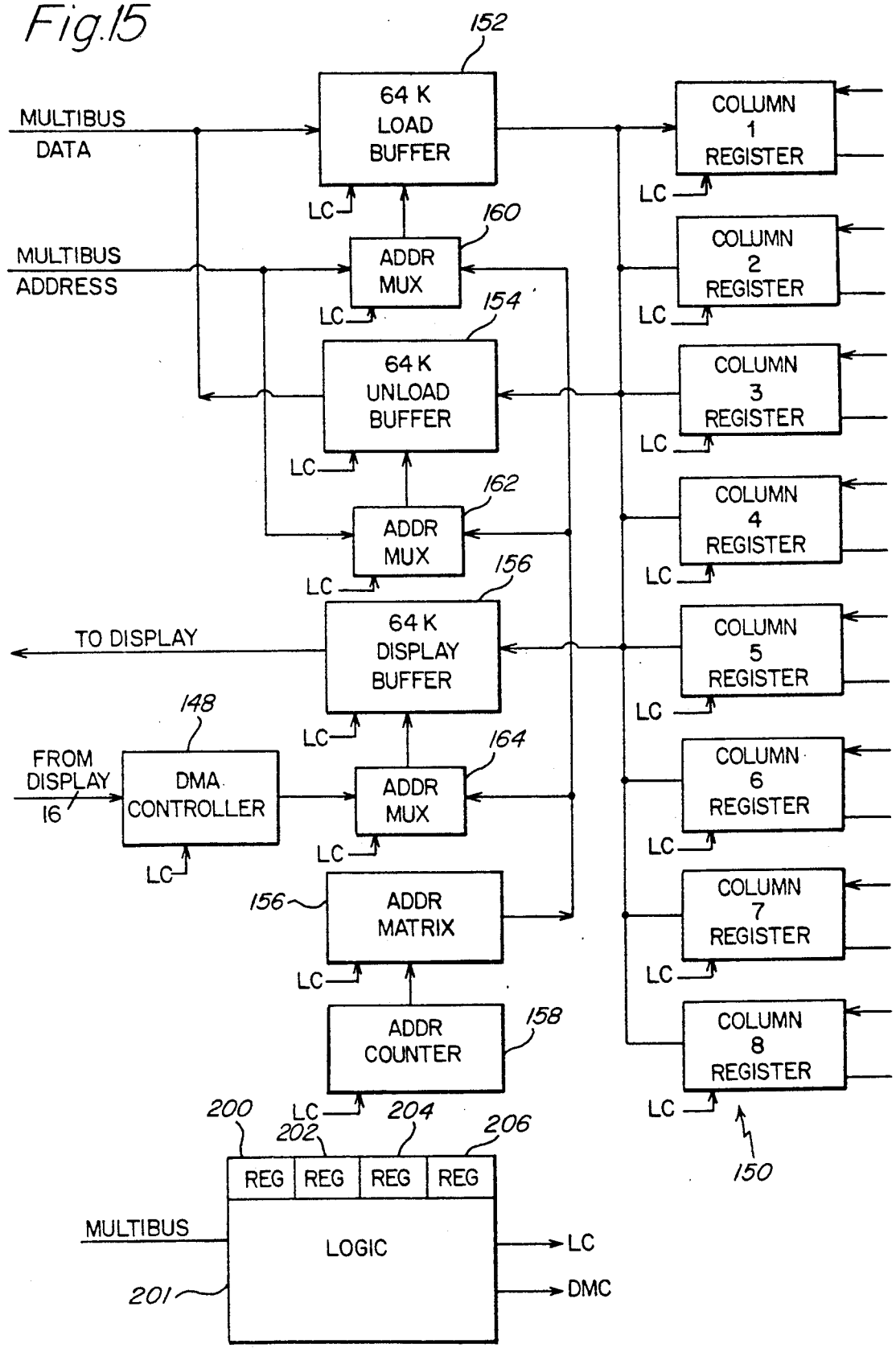
FIG. 15 is an illustration of the serial input/output device of the host processor of FIG. 14.

The SIO subsystem provides the data interface between the host and the array of slaves. The principal data and address paths are depicted in FIG. 15.

Each of the eight registers 150 at the right edge of the figure forms one link of a ring serving a single column of the array. These registers are individually loaded or unloaded, one 16-bit word at a time. Their contents are then serially shifted, one bit at a time, in unison. The SIO subsystem accommodates faulty columns as described below.

The SIO memory board contains three 64K word buffer memories 152, 154, 156. A load buffer 152 supports loading of the array; an unload buffer 154 supports unloading, and a display buffer 156 provides data to the display system. The unload buffer and the display buffer are simultaneously loaded from the array but may be independently unloaded.

Several diagnostic capabilities are provided for verifying the integrity of the SIO. One diagnostic mode allows the serial/parallel registers to be bypassed; in this mode, data from the input buffer are written directly to the output buffer. Another mode allows a loop test to be run in which data are sent through the entire derial link but are not transferred to slave memories.

The order in which data must be sent to or received from the slaves is quite different from the order in which they are naturally stored or displayed. The necessary reformatting may be done by the host and the intelligent display system. However, for 128×128, and 256×256 data formats, which fit evenly into the 512×512 pixel format of the display screen, this reordering may be accomplished simply by permuting address bits. The address matrix 156 in FIG. 15 performs this function from the count of address counter 158. Address multiplexers 160 and 162 select load and unload buffer addresses from the address matrix or the host. Multiplexer 164 selects the display buffer address from the address matrix or a DMA controller 148 associated with the display.

The SIO may be viewed as a DMA controller operating between its own on-board SIO buffers 150 and off-chip slave memory 42. All transfers are controlled by logic 201 through local control signals LC. The only initiatives required of the host CPU are to transfer data to and/or from the SIO buffers via MULTIBUS, issue transfer parameters to the SIO and DMC, and issue commands to the SIO.

The SIO contains a load buffer 152 for data being transferred to the slaves and an unload buffer 154 for data being transferred from the slaves. The CPU via an SIO command register 200 can cause the SIO to perform either a load or an unload of slave memory. Having started a load or unload sequence, the SIO continues until the operation is complete. While the SIO operation using one of the buffers is in progress, the CPU may access the other buffer.

Upon receiving a load or an unload command at the command register, the SIO logic 201 supervises all interactions with the slave array, including handshaking directly with the DMC. The CPU is freed from all detailed supervisory responsibilities. At any time, however, the CPU can monitor SIO activity via an SIO status register.

CPU 144 controls and monitors the activities of the SIO via several MULTIBUS I/O-mapped control registers. These are the command 200, status 202, transfer word count 204 and column mask 206 registers. The command status registers have been described previously. The load/unload transfer count register is a 16-bit port that is loaded with the desired number of words to be transferred into or out of the slaves.

The I/O column mask contains information regarding the operational status of the slave columns. The CPU sets the mask, 8 bits corresponding to the 8 columns, to indicate which of the 8 columns are operational. The SIO uses this information to "bypass" faulty columns. In the event of a failed column, the data intended for a defective column (slave load) are rerouted to the next in line. "Leftover" data are ignored. Data from a defective column (slave unload) are ignored, and data from the next column fill the slot.

In order to skip a column, the host writes to the I/O MASK REGISTER with a low or zero in the column or columns to be skipped. Data destined for the bad column will go to the next available colmun. Likewise, data that should have gone to the last column during the load sequence will be ignored. During unload, skipping will also take place and zeros will be read into memory. This missing column configuration will result in the degradation of the system but will allow the operation of the system to continue in the degraded mode.

The following is a description in detail of the set-up and execution of host-slave data transfers. Included is a description of SIO programming, as well as a description of the host devices involved in a data transfer operation.

Loading the slaves is basically a two-step process. The first step involves transferring data from mass storage to the SIO load buffer memory 152. The second step takes the data from the SIO load buffer memory and sends it to the slaves. These two steps are detailed below:

(1) The mass storage-to-load buffer transfer involves the CPU and the SBC 226 Removable Hard Disk controller. The CPU via the RMX 86 operating system, loads DMA parameters (i.e., starting address, xfer count, etc.) into the 226 I/O multibus parameter block of system RAM. The CPU then tells the 226 to "go" by writing to the 226's Controller Status Register. At that point, the 226 begins transferring data, continuing until the appropriate number of words are transferred, at which time the CPU is notified by an interrupt.

The capability to transfer data directly from the CPU to the slaves (i.e., no mass memory involved) is also provided. For this type of transfer, the CPU first writes the data to be transferred directly into the SIO load buffer; the subsequent transfer to the array proceeds as described below.

(2) The second step of the loading process involves the CPU, DMC and SIO.

The CPU enters the data destination address, i.e., the off-chip slave memory address, into the DMC's load slave memory address register.

Finally, to activate the SIO data transfer, the CPU writes the appropriate value to the command register. The SIO logic 201 thence completely controls the data transfer to the slaves without CPU intervention. The SIO shifts data through the slave SIO registers, each of the 8 columns operating concurrently. After 128 shifts (8 words×16 bits/word), the SIO requests a memory write cycle of the DMC. When the reuqest is granted, the DMC acknowledges and then writes a data word into the same off-chip memory address of all 64 slaves simultaneously. The slave memory address is incremented by the DMC. The SIO continues the loading process until the number of words indicated by the transfer word have been loaded into the slaves. At that time, the SIO generates a MULTIBUS interrupt and sets its busy/not busy status register bit to not busy. By monitoring the busy bit, the CPU can determine whether or not the data transfer is complete.

The unloading process is similar to the loading process. The major difference is that the order of execution is reversed. The SIO and DMC are initialized and then perform their duties first. These duties include writing both the unload buffer memory 154 and the display buffer memory 156 simultaneously, followed by a DMA transfer of data out of the SIO and onto the hard disk and/or to the graphics subsystem. The DMC and SIO have parameters passed to their registers to initialize the unload operation. When the CPU determines that the array has data available to be unloaded, it writes the approprite value to the command register to start an unload sequence. The DMC and SIO handshake, and when the requested number of words are received from the slaves, an interrupt is generated and busy/not busy is set to not busy.

After detecting that an unload is complete, the CPU can command the SIO transfer of data from the unload buffer. The 226 and the 589 DMA can access their own buffers independently. The appropriate parameters for the selected devices(s) are issued.

SOFTWARE

Figure 16:
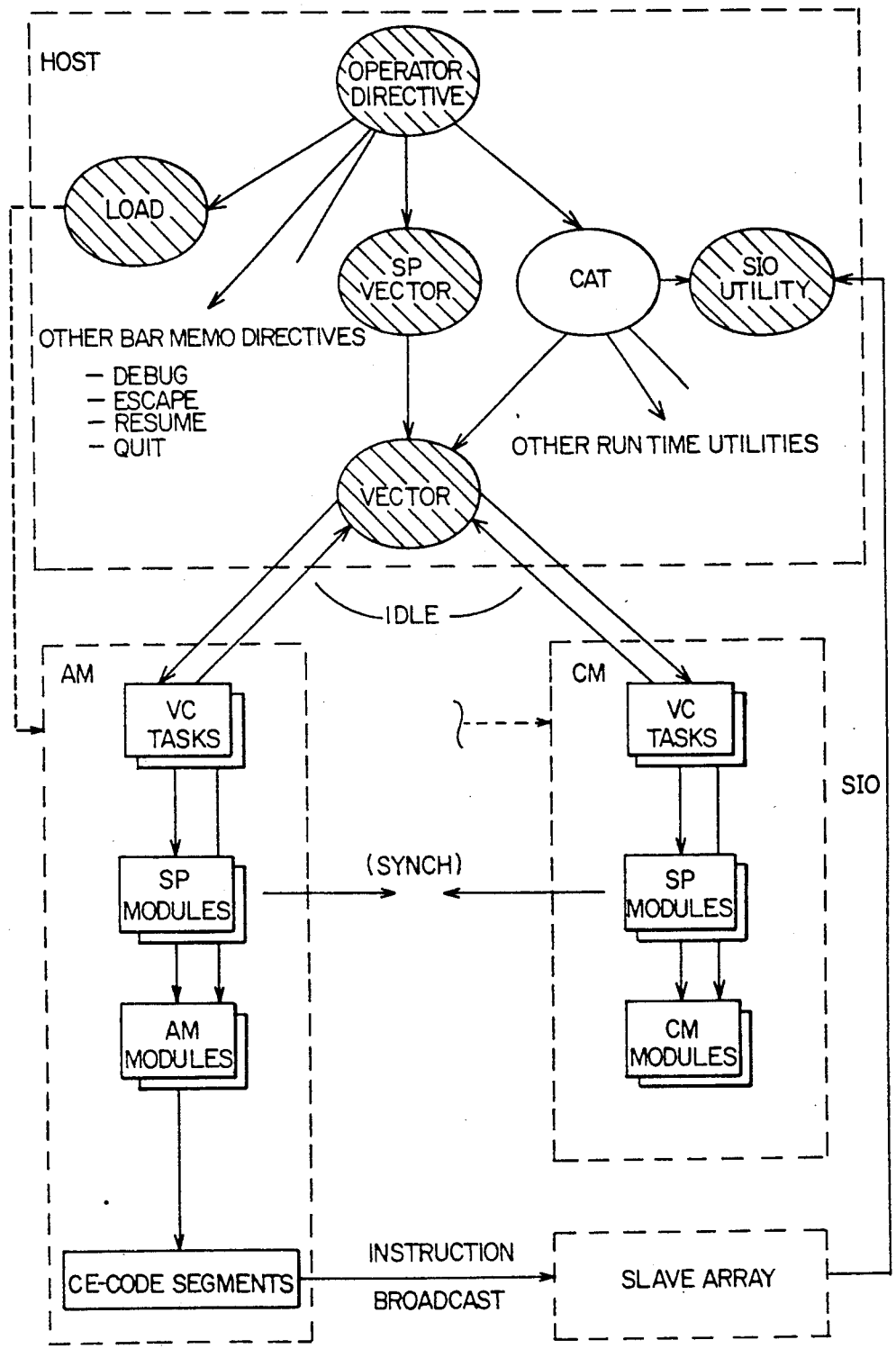
FIG. 16 is a schematic illustration of a typical application program structure for use in the system on FIG. 1.

An application program for the synchronous processor system conforms to a hierarchical structure which reflects the hierarchy of the system itself as depicted in FIG. 16.

The unshaded boxes in FIG. 16 represent application-specific software programs which the user writes. The shaded areas represent Host Application Control Environment (ACE) facilities to support applications using the particular processor in the host. These include facilities to manage operator interaction, download code into the AM, CM and CE code spaces, control execution of the AM and CM, manage the SIO, and debug AM, CM and CE code. Most of the ACE facilities may be invoked from a Customized Application Tester (CAT) program written by the user for each application. The CAT program may be written in FORTRAN or PL/M. The CAT program controls the SP array at the top level. It downloads code into the array, configures the array and controls execution of the application's VC tasks. The CAT program also controls the application's SIO data transfers, operator interaction and performs application-specific computations.

The VC tasks are the highest level programs within the array itself. Each VC task defines an entry point in the array, i.e., in the AM and CM code spaces, to which the CAT program may vector via the VECTOR utility provided by ACE. The set of VC tasks for an application constitutes the set of all possible entry points for the application. The addresses of the VC tasks may be obtained by CAT via the GETADDR utility of ACE.

A HALT instruction is atuomatically inserted by the Translator at the end of each VC task; execution of the HALT causes an interrupt and return of control to the Host.

Below the VC tasks in the hierarchy are the SP modules which are invoked by VC tasks via the CALL/RETURN mechanism of the AM and CM. SP modules invoke AM and CM modules or other SP modules. Module invocation is via the CALL/RETURN mechanism. SP modules coordinate the execution of the AM and CM via the SYNC instruction. The AM module may contain CE code as well as AM code. It performs computations for the application whereas the CM module performs the inter-slave communication. As depicted at the bottom of FIG. 16, AM modules can invoke other AM modules, and CM modules can invoke other CM modules.

Figure 17:
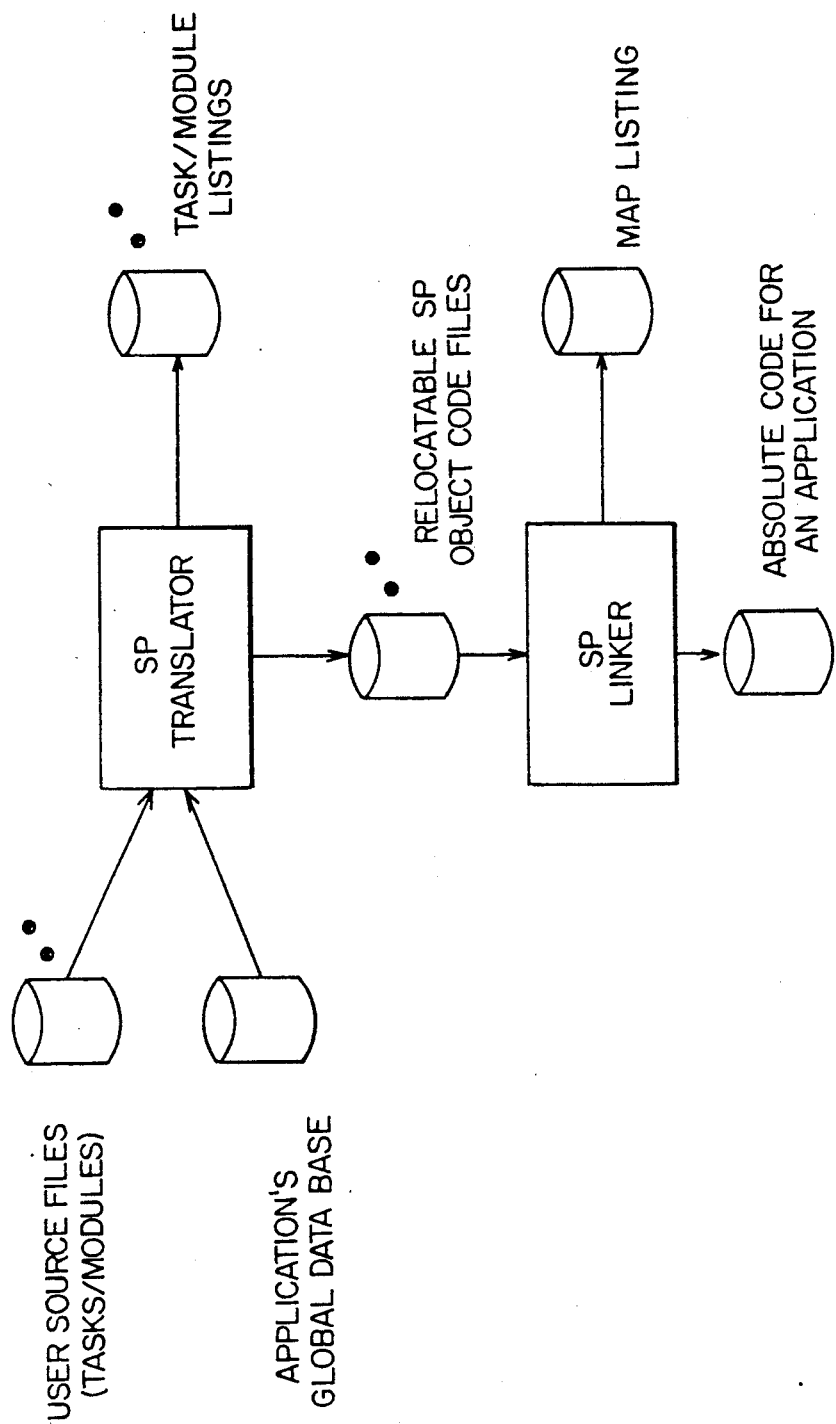
FIG. 17 is an illustration of the translator and linker used in developing the code processed by the system of FIG. 1.

FIG. 17 depicts two major tools which are included in the microfiche appendix: the Synchronous Processor (SP) Translator and SP linker. These tools run on an IBM PC equipped with RTCS/UDI. As indicated in FIG. 17, the Translator translates user source files belonging to an application and produces relocatable object code files. Note that a Global Data Base (GDB) specific to the application is used by the Translator. The GDB contains the names and attributes of all of the Global variables of the application. The SP Linker accepts the relocatable code files and produces one absolute code (COD) file containing the code to be downloaded into the SP.

Figure 18:
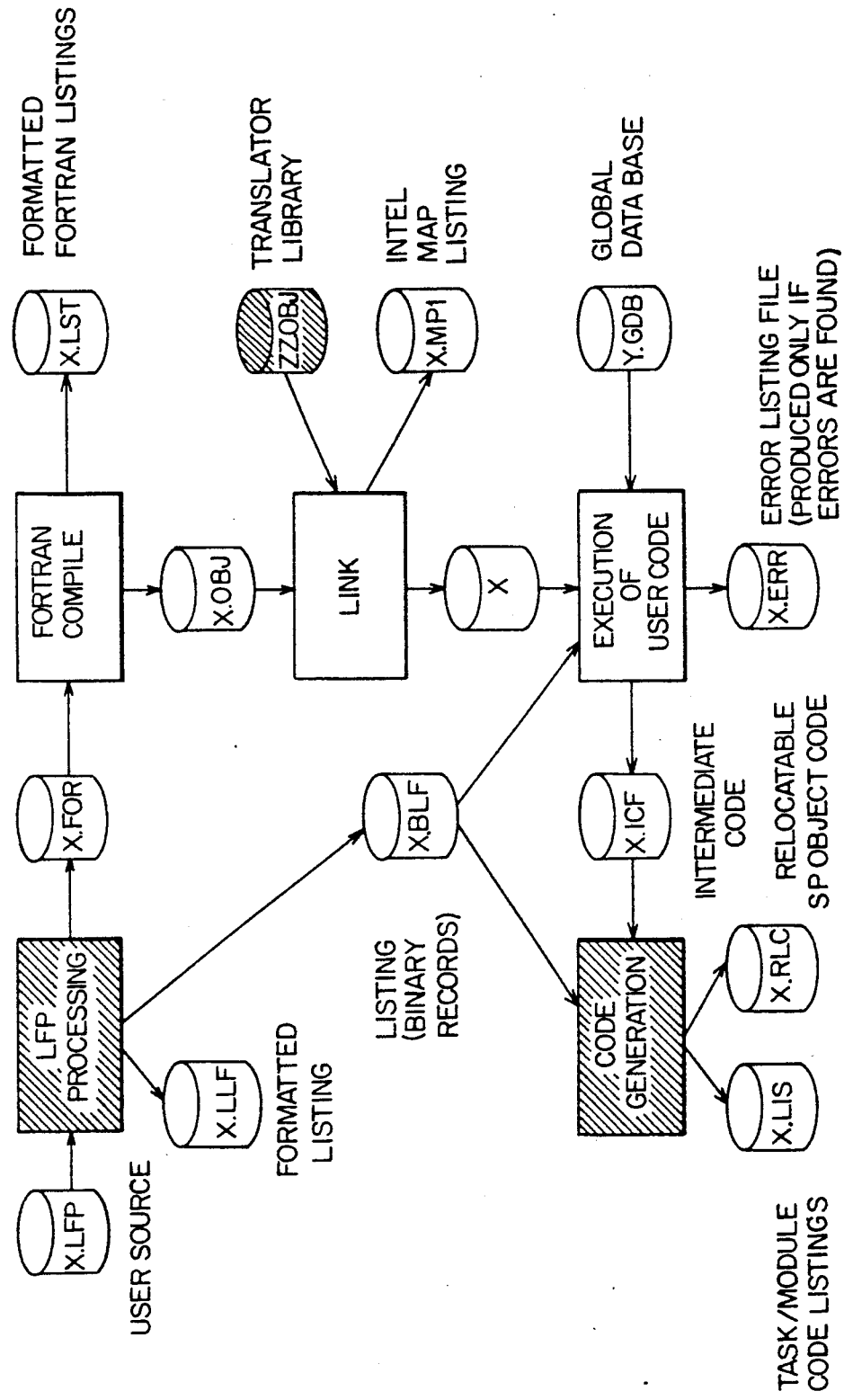
FIG. 18 is a detailed block diagram of the translator of FIG. 17.

The Translator is the set of software that provides the capability to translate user source code into machine language. Code translation is depicted in FIG. 18. The three shaded items in FIG. 18 represent the three SP-specific components of the Translator software: LFP, the Translator library, and the Code Generation program.

Note that in addition to these three, the translation process includes the use of two commercial products, namely, the FORTRAN compiler and the vendor supplied (Intel or DEC) Link software. The box in FIG. 18 labelled "Execution of User Code" is also involved in the translation process. This execution is controlled by a user-supplied main program that is the top level driver of the code generation process.

The large number (14) of files shown in FIG. 18 is misleading. Many of them are automatically erased by command language statements during the translation process. If the translation is successful, only the LIS and RLC files need to be retained along with, of course, the user source, the LFP file. A synopsis is presented in Table 8 which briefly indicates the role of each file.

TABLE 8

| File | Producer | Contents/Comments |
| --- | --- | --- |
| ZZ.OBJ | FORTRAN | Translator Library object code |
| X.LFP | User | original user source created using a standard editor such as Intel's ALTER. 'X' is a user-supplied name |
| Y.GDB | User | the Global Data Base for the application 'Y' |
| X.FOR | LFP | FORTRAN source. Do not bother printing this one - may be erased immediately after compilation. |
| X.LLF | LFP | formatted listing of the user programs. |
| X.BLF | LFP | the lines of original user source. Do not erase this one until after code generation associated with 'X' is completed. |
| X.LST | FORTRAN | a listing of the FORTRAN source. Do not bother printinq this one - may be erased immediately after compilation. |
| X.OBJ | FORTRAN | object code corresponding to X.FOR. Retain until Intel Link is completed. |
| X.MP1 | INTEL LINKER | If no link errors, do not bother looking at this one. Erase it immediately after the Intel Link. |
| X | INTEL LINKER | User code executable on IBM PC. |

TABLE 8-continued

| File | Producer | Contents/Comments |
| --- | --- | --- |
| X.ICF | TRANSLATOR LIBRARY | Contains intermediate code in the form of directives for the Code Generation software. May be erased after it is processed by the Code Generation software. |
| X.ERR | TRANSLATOR LIBRARY | Exists only if errors occur. |
| X.RLC | CODE GEN. | Contains relocatable object code for the Sp. Retain for the SP Linker. |
| X.LIS | CODE GEN. | A listing of the SP code resulting from the translation. Print this one. |

The unified body of code in an AM module is processed by the Translator to generate code for the AM and CEs. A segment of code from an AM module is presented below to illustrate how the various statements appear in the source and the result after translation:

```
SOURCE CODE:              AM CODE
If( value.eq.1 ) then       LOOP N;
  LOOP N;                   XEQ CEAddr;
  ADD *+,1,0;               REPL;
  SUB *+,0,1;
  REPL:
End If                    CE CODE
                            ADD *+,1,0;
                  CEAddr    SUB *+,0,1; .E
```

Note that whether or not any AM/CE code is generated depends on the value of the FORTRAN variable "value." In addition, note that the Translator separates the CE code from the AM code. It also constructs an AM XEQ instruction which will cause the CE instruction stream beginning at "CEAddr" to be appropriately transmitted to the CEs. As far as the AM is concerned, the XEQ is simply a no-operation.

As illustrated by the above example, the user does not explicitly code the "XEQ". The parallelism between the AM and the CEs is automatically handled by the Translator.

During translation LFP and FORTRAN statements coexist with SP statements indicated by % symbols and are used to compute quantities and to control the translation process. In particular, the LFP and FORTRAN statements may be used to unroll code. For example, the statements:

```
Do (j=1,3)
  Do (i=1,j)
    add A(i,j);
  Fin
``` will, when unrolled at translate-time, produce:

```
%   add A(1,1);
%   add A(1,2);
%   add A(2,2);
%   add A(1,3);
%   add A(2,3);
%   add A(3,3);
```

After code generation, addresses of the desired elements of "A" will be planted into the machine code.

The ability to unroll code or create what is sometimes called straight-line code is a powerful technique for producing efficient run-time code streams. In the above code, for instance, the SP during run-time does not wast time computing the addresses of the elements of "A" or testing to see whether all of the elements have been added.

The debit side of code unrolling is that the unrolled code takes up code space. While a great deal of code space is provided, 128K instructions in each master and 256K for the CEs, it can no doublt be consumed by code unrolling if the user is not careful.

The code unrolling trade-off is fundamentally a trade between run-time efficiency and code space. In making this trade, the user needs to also factor in the looping capability of the AM and CM, and the ability of the CEs and CM to address data. For example, suppose the first 100 elements of the off-chip variable "VArray" are to be added. Two coding options present themselves as follows:

```
(1) Unroll:
    %   associate EAR(2) with V;
    %   lac V(1); set ACC & set EAR
    %   Do (i=1,99)
            add V(#+1);
        Fin
(2) Use the AM LOOP:
    %   associate EAR(2) with V;
    %   lac V(1); set ACC & set EAR
    %   loop 99;
    %       add V(#+1);
    %   repl;
```

The translator unrolls the DO instruction but retains the LOOP instruction as a loop. Therefore, the programmer has two loop options. Option (1) will produce 99 ADD instructions which consumes 99×2=198 machine code words of CE code space. On the other hand, Option (2) will produce only 1 ADD instruction which takes 2 machine code words to CE code space and, in addition, will cosume 3 AM machine code words.

Both options will execute in approximately the same time on the SP since in Option (2) the AM operates in parallel with the CEs. It is clear then that Option (2) is preferable since it saves code space. In situations in which the indexing into data arrays is more complicated, unrolling usually is the clear winner in terms of run-time efficiency if the application can afford the code space.

While this invention has been particularly shown and described with references to a preferred embodiment thereof, it will be understood by those skilled in the art that various changes in form and details may be made therein without departing from the spirit and scope of the invention as defined by the appended claims.

We claim:

1. A parallel data processing system comprising:
    an array of slave processors which simultaneously process respective data streams, each slave processor of the array comprising a multibit computational element having local memory, an external data memory which stores data to be transferred to and processed by the computational element, and a communications register for data being transferred between the external data memory and another slave processor of the array, each slave processor allowing for simultaneous processing of instructions by the computational element and transfer of data from the external data memory to the communications register;
    an array master processor which processes an operational set of instructions and broadcasts a single computational instruction stream to the slave processors of the array for parallel processing of data;
    a communication master processor which processes a communications set of instructions to control transfers of data from slave processors of the array to other slave processors of the array, the array master processor and the communication master processor processing the operational and communications sets of instructions in parallel; and
    a data memory controller responsive to simultaneous requests from the array master processor and the communications master processor for arbitrating said requests and initiating control signals for said communications register and external data memory to control addressing of the external data memory of each slave processor of the array in transfers within each slave processor between the external data memory and each of the computational element and the communications register.

2. A data processing system as claimed in claim 1 further comprising an input/output (I/O) processor which processes an I/O set of instructions to control transfer of data between slave processors of the array and a system memory, the I/O processor processing the I/O set of instructions in parallel with processing of the operational and communications sets of instructions by the array master processor and the communication master processor.

3. A data processing system as claimed in claim 2 wherein each slave processor further comprises an I/O register for data being transferred between the external data memory and the system memory and a communications register for data being transferred between the external data memory and another slave processor of the array, the I/O register and communications register allowing for simultaneous transfer of data between the slave processor and the system memory and between the slave processor and other slave processors.

4. A data processing system as claimed in claim 2 wherein the array master processor processes an operational set of instructions, the operational set of instructions including control code and computational code, the computational code being broadcast to the slave processors of the array for parallel processing of data and the control code being processed by the array master processor, blocks of control code and blocks of computational data being processed simultaneously by tha array master proccessor and the slave processors.

5. A data processing system as claimed in claim 1 wherein the array master processor processes an operational set of instructions, the operational set of instructions including control code and computational code, the computational code being broadcast through the slave processors of the array for parallel processing of data and the control code being processed by the array master processor, blocks of control code and blocks of computational data being processing simultaneously by the array master processor and the slave processors.

6. A parallel data processing system comprising:
    an array of slave processors which simultaneously process respective data streams, each slave processor of the array comprising a multibit computational element having local memory, an external data memory which stores data to be transferred to and processed by the computational element, an input/output (I/O) register for data being transferred between the slave memory and a system memory, and a communications register for data being transferred between the external data memory and another slave processor of the array, each slave processor allowing for simultaneous processing of instructions by the computational element and transfer of data from the external data memory to the I/O register and to the communications register;

an array master processor which processes an operational set of instructions and broadcasts a single instruction stream to the slave processors of the array for parallel processing of data;

a communication master processor which processes a communications set of instructions to control transfers of data between slave processors of the array;

an I/O processor which processes an I/O set of instructions to control transfer of data between slave processors of the array and the system memory; and a data memory controller responsive to simultaneous requests from the array master processor, the communications master processor and the I/O processor for arbitrating said requests and initiating control signals for said communications register, said I/O register and said external data memory to control addressing of the external data memory of each slave processor of the array in transfers within each slave processor between the external data memory and each of the computational element, I/O register and communications register;

the array master processor, the communications master processor and the I/O processor processing the computational, communications and I/O sets of instructions in parallel for simultaneous transfers of instructions and data to and from and between the slave processors.

7. A data processing system as claimed in claim 6 wherein the array master processor processes an operational set of instructions, the operational set of instructions including control code and computational code, the computational code being broadcast through the slave processors of the array for parallel processing of data and the control code being processing by the array master processor, blocks of control code and blocks of computational data being processed simultaneously by the array master processor and the slave processors.

* * * * *